(12) United States Patent
Fujimori et al.

(10) Patent No.: US 7,150,543 B2
(45) Date of Patent: Dec. 19, 2006

(54) OPTICAL MODULATOR HOLDER, OPTICAL DEVICE, AND PROJECTOR

(75) Inventors: Motoyuki Fujimori, Suwa (JP); Toshiaki Hashizume, Okaya (JP); Masami Murata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 95 days.

(21) Appl. No.: 11/084,110

(22) Filed: Mar. 21, 2005

(65) Prior Publication Data

US 2005/0213228 A1    Sep. 29, 2005

(30) Foreign Application Priority Data

Mar. 26, 2004    (JP)    ............... 2004-092361

(51) Int. Cl.
*F21V 29/00* (2006.01)
*G02F 1/1335* (2006.01)
*G03B 21/16* (2006.01)

(52) U.S. Cl. ............ 362/373; 362/264; 362/294; 349/161; 353/54

(58) Field of Classification Search ............ 362/294, 362/264, 373, 318; 353/54, 60–61; 349/161, 349/5, 62
See application file for complete search history.

(56) References Cited

U.S. PATENT DOCUMENTS

| | | | |
|---|---|---|---|
| 5,857,768 A | 1/1999 | Ziegler et al. | |
| 6,256,083 B1 | 7/2001 | Numata et al. | |
| 6,834,964 B1 * | 12/2004 | Nishihara et al. | 353/52 |
| 6,891,652 B1 * | 5/2005 | Fujimori et al. | 359/246 |
| 6,966,654 B1 * | 11/2005 | Ozawa et al. | 353/61 |
| 2003/0035290 A1 | 2/2003 | Bornhorst | |
| 2003/0086051 A1 * | 5/2003 | Chou et al. | 349/161 |
| 2003/0147036 A1 * | 8/2003 | Kaise et al. | 349/161 |

FOREIGN PATENT DOCUMENTS

| | | |
|---|---|---|
| JP | A-01-159684 | 6/1989 |
| JP | A-2003-124670 | 4/2003 |

* cited by examiner

*Primary Examiner*—Ali Alavi
(74) *Attorney, Agent, or Firm*—Oliff & Berridge, PLC

(57) ABSTRACT

An optical modulator holder (4402) has an optical modulator holding unit (4405) having a substantially rectangular U-shaped cross-section and made of heat-conductive material, a plate-like member (4406) made of heat-conductive material, and an optical modulator cooling unit (4407) constituted by a hollow member which is capable of enclosing cooling fluid inside and is made of heat-conductive material. Of the optical modulator holding unit (4405) and the plate-like member (4406), peripheries of openings (4405A1, 4406A) each contact heat-transferably a liquid crystal panel (441). The liquid crystal panel (441) is held inside the rectangular U-shape of the optical modulator holding unit (4405). The optical modulator cooling unit (4407) is formed like a ring whose inner side surface heat-transferably contacts the liquid crystal panel (441), and has an inlet port (4407D) and outlet port (4407E).

24 Claims, 15 Drawing Sheets

OPTICAL MODULATOR HOLDER, OPTICAL DEVICE, AND PROJECTOR

BACKGROUND OF THE INVENTION

1. Field of the Invention

The present invention relates to an optical modulator holder, an optical device, and a projector.

2. Description of Related Art

There is a known conventional projector having an optical modulating device which modulates light beams emitted from a light source in accordance with image information to form an optical image, and a projection optical device which projects the light beam modulated by the optical modulating device in an enlarged manner.

In such projectors, the optical modulating device generally adopts, for example, an active-matrix driven optical modulator in which electro-optic material such as liquid crystal is enclosed and sealed between a pair of boards. More specifically, the pair of boards included the optical modulator consist of a drive board which is provided on the light-irradiation side and has data lines, scanning lines, switching elements, pixel electrodes, and the like formed to apply a drive voltage to the liquid crystal, and an opposite board which is provided on the light-incident side and has a common electrode and a black mask formed thereon.

On the light-incident side and the light-irradiation side of the optical modulator, an incident-side polarization plate and an irradiation-side polarization plate are provided respectively. Each of these polarization plates allows light beam having a predetermined polarization axis to pass.

When light beam emitted from a light source is irradiated on the optical modulator, the temperature of the optical modulator easily rises due to absorption of light by the layer of liquid crystal, the data lines and scanning lines formed on the driving board, the black mask formed on the opposite board, etc. Of the light beam emitted from the light source and the light beam which has passed through the optical modulator, light beam that has no predetermined polarization axis is absorbed by the incident-side polarization plate and the irradiation-side polarization plate, causing these polarization plates to heat.

Therefore, for a projector which internally has this kind of optical element, a structure having a cooling device with use of a cooling fluid has been proposed in order to restrain the temperature rise of the optical element (e.g., Reference: Japanese Patent Application Laid-Open Publication No. Hei 1-159684.)

That is, the cooling device disclosed in the Reference has a cooling chamber which supports an optical modulator and a polarization plate on the light-source side kept separate from each other and is filled with the cooling fluid. This cooling chamber is connected to and communicates with a radiator and a fluid pump by tubes and the like through which the cooling fluid flows. Therefore, the internal cooling fluid circulates through a flow path from the cooling chamber to the radiator, the fluid pump and back to the cooling chamber through the tubes. According to this structure, heat generated at light beam transmission areas of the optical modulator and the incident-side polarization plate by light beam emitted from the light source is released directly to the cooling fluid.

In the cooling device disclosed in the Reference, however, light beam irradiated from the light source transmits the cooling fluid and may thereby cause a problem as follows.

For example, if air bubbles and dust are mixed in the cooling fluid and irradiated by the light beam, images of those bubbles and dust are reflected on an optical image formed by the optical modulator.

Alternatively, for example, if the cooling fluid is caused to have a temperature difference, the cooling fluid is also caused to have variance in the refraction index, which results in shimmering of the optical image formed by the optical modulator.

Also alternatively, for example, if the cooling fluid deteriorates due to the light beam irradiated from the light source, transmittance of light beam drops, which causes deterioration in illumination intensity or color reproducibility of the optical image formed by the optical modulator.

Demands have hence arisen for a structure capable of maintaining stably an optical image formed by an optical modulator and capable of efficiently cooling the optical modulator.

SUMMARY OF THE INVENTION

A major object of the present invention is to provide an optical modulator holder, optical device, and projector capable of stably maintaining optical images formed by an optical modulator and of efficiently cooling the optical modulators.

An optical modulator holder according to an aspect of the present invention holds and cools an optical modulator forming an optical image by modulating light beam emitted from a light source in accordance with image information, the holder having: an optical modulator holding unit including a rectangular plate-like member having an opening corresponding to an image formation area of the optical modulator, and a pair of upright parts being upright in an out-of-plane direction respectively from opposed edges of the rectangular plate-like member, the optical modulator holding unit having a cross-section showing a substantially rectangular U-shape and being made of heat-conductive material; a plate-like member having an opening corresponding to the image formation area of the optical modulator, and made of heat-conductive material; and an optical modulator cooling unit constituted by a hollow member which is made of heat-conductive material and capable of enclosing cooling fluid inside, in which: in the rectangular plate-like member of the optical modulator holding unit and the plate-like member, peripheries of the openings heat-transferably contact each of a light-incident side and a light-irradiation side of the optical modulator, thereby holding the optical modulator inside the rectangular U-shape of the optical modulator holding unit, and the optical modulator cooling unit is formed in a ring-like shape arranged so as to surround outer circumference of the optical modulator and connect heat-transferably to the optical modulator through inner side, and has an inlet port for introducing the cooling fluid flow to the inside and an outlet port for discharging the internal cooling fluid flow to the outside.

In the present invention, the optical modulator cooling unit is constituted by a hollow member capable of internally enclosing cooling fluid, and has a ring-like shape surrounding the outer circumference of the optical modulator. Therefore, light beam does not transmit the cooling fluid in the optical modulator cooling unit. As a result, for example, even if air bubbles, dust, or the like is mixed into the cooling fluid, such air bubbles or dust is not irradiated by the light beam. Therefore, images of air bubbles or dust are not reflected on optical images formed by the optical modulator. Alternatively, for example, even if the cooling fluid is caused to have a temperature difference, optical images formed by the optical modulator do not shimmer. Further, for example, even if the cooling fluid deteriorates and is colored, optical images formed by the optical modulator do not cause deterioration in luminance intensity or in color reproducibility.

In addition, the optical modulator cooling unit is made of heat-conductive material and is heat-transferably connected at inner side thereof to the optical modulator. Therefore, heat generated at the optical modulator can be released to the internal cooling fluid via the optical modulator cooling unit. Further, inlet ports and outlet ports are formed in the optical modulator cooling unit. Hence, for example, if the inlet and outlet ports are connected with use of a fluid circulator capable of flowing the cooling fluid, the cooling fluid can convect with ease. It is thus possible to avoid a situation that the cooling fluid heated by the optical modulator stays inside the optical modulator cooling unit. As a result, the temperature difference between the optical modulator and the cooling unit is not decreased due to the cooling fluid heated by the optical modulator, and thus the optical modulator can be efficiently cooled.

Further, the optical modulator holding unit and the plate-like member included in the optical modulator holder are made of heat-conductive material, and the periphery of each opening heat-transferably contacts the optical modulator, thereby holding the optical modulator. Therefore, not only heat generated at the optical modulator can be released to the optical modulator cooling unit but also heat transmitted from both of the light-incident side and the light-irradiation side of the optical modulator can be released to the optical modulator holding unit and the plate-like member. Thus, the cooling efficiency of the optical modulator can be improved.

Furthermore, the optical modulator holding unit has a substantially rectangular U-shaped cross-section, the optical modulator is held between the rectangular plate-like member and the plate-like member inside the rectangular U-shape. Therefore, for example, if the structure is arranged such that the optical modulator holder is set in the optical device and the open part of the rectangular U-shape is closed by another member, a cylindrical space is created by the optical modulator holding unit and said another member. If, for example, the structure is arranged such that cooling air is passed through this space by a cooling fan or the like, the cooling air does not leak out of the space. The optical modulator in the space, the inner side of the optical modulator holding unit, the plate-like member, and the optical modulator cooling unit can be forcibly cooled. In addition to the cooling by the cooling fluid as described above and the heat transfer release to the optical modulator holding unit and the plate-like member as also described above, a structure capable of more efficiently cooling the optical modulator can be realized.

Accordingly, optical images formed by the optical modulator can be maintained stably and the optical modulator can be cooled efficiently. The object of the present invention can thus be achieved.

Preferably, in the optical device according to the present invention, the rectangular plate-like member and the plate-like member have a larger outer size than that of the optical modulator, and the optical modulator cooling unit is held by the rectangular plate-like member and the plate-like member and is heat-transferably connected to the peripheries of the openings of the rectangular plate-like member and the plate-like member, in a state in which the optical modulator holder is assembled completely.

According to the present invention, the optical modulator cooling unit is heat-transferably connected to the peripheries of the openings of the rectangular plate-like member and the plate-like member. Therefore, it is possible to securely maintain a heat transfer path through which the heat transferred from the optical modulator to the rectangular plate-like member and the plate-like member is transmitted to the cooling fluid inside via the optical modulator cooling unit. As a result, the cooling efficiency of the optical modulator can be more improved.

In addition, since the optical modulator cooling unit can be fixed to the optical modulator holding unit and the plate-like member, the optical modulator holder can be integrated so that the optical modulator can be stably held.

Preferably, in the optical modulator holder according to the present invention, the plate-like member is formed with a plate member having a rectangular shape in a plan view, and has a pair of folded parts folded in an out-of-plane direction of the plate member, and the pair of folded parts are connected heat-transferably to opposed end faces of the pair of upright parts of the optical modulator holding unit, in a state where the optical modulator holder is assembled completely.

According to the present invention, the pair of folded parts of the plate-like member are connected heat-transferably to the pair of upright parts of the optical modulator holding unit. Therefore, it is possible to securely maintain a heat-transfer path through which the heat transferred from the optical modulator to the plate-like member is transmitted to the pair of upright parts of the optical modulator holding unit. As a result, the cooling efficiency of the optical modulator can further be improved.

In addition, the plate-like member can be fixed to the pair of upright parts of the optical modulator holding unit, so that the optical modulator can be held stably.

Preferably in the optical modulator holder according to the present invention, the optical modulator holding unit and the plate-like member are made of iron-nickel alloy.

As the iron-nickel alloy mentioned here, for example, invar or 42Ni—Fe can be used.

However, if the optical modulator adopts a structure in which electro-optic material is enclosed and sealed between a pair of glass plates, for example, a difference in thermal expansion coefficient likely generates between the optical modulator holding unit, the plate-like member, and the pair of glass plate. When the thermal expansion coefficient differs greatly, the following problem may then occur.

Suppose, for example, in a case that the optical modulator is assembled in the optical modulator holder, and the optical modulator holding unit and the plate-like member are heat-transferably brought into contact with the pair of glass plates by an adhesion or the like. Then, when heat is generated in respective components because of the light beam irradiated from the light source, dimensional changes (expansion and contraction) of variant amounts are caused by the heat in the respective components, which results in deformation of the optical modulator. As a result, changes in shape of the electro-optic material sealed between the pair of boards cause deterioration in image quality.

According to the present invention, since the optical modulator holding unit and the plate-like member are made of iron-nickel alloy, the thermal expansion coefficients of the optical modulator holding unit and the plate-like member are set close to the thermal expansion coefficient of the pair of glass plates. Therefore, the amount of dimensional changes (expansion and contraction) caused by heat of respective components can be substantially equalized between the optical modulator holding unit and plate-like member, and the pair of glass plates. As a result, the heat generated at the optical modulator can be transferred properly to the optical modulator holding unit and the plate-like member. In addition, the optical modulator is prevented from being deformed by such dimensional changes of respective components caused by heat even if the optical modulator holding unit and the plate-like member are fixed to the pair of glass plates by an adhesion or the like. Deterioration of image quality caused by changes in shape of electro-optic material sealed between the pair of glass plates can be avoided.

Preferably, an optical device according to the present invention includes an optical modulator that modulates light beam emitted from a light source in accordance with image information to form an optical image, the optical device including: the optical modulator holder of the above-described present invention; and a plurality of fluid circulators which are connected so as to communicate with an inlet port and outlet port of an optical modulator cooling unit included in the optical modulator holder, guide cooling fluid in the optical modulator cooling unit to outside, and guide the cooling fluid again into the optical modulator cooling unit.

According to the present invention, the optical device has the optical modulator holder and the plurality of fluid circulators. Therefore, the same advantages and effects as the optical modulator holder described above can be obtained.

In addition, since cooling fluid is enclosed not only in the optical modulator cooling unit but also in the plurality of fluid circulators, the capacity of the cooling fluid can be increased. Thus, heat exchange capability between the optical modulator and the cooling fluid can be improved.

Preferably in the optical device according to the present invention, a plurality of optical modulators each being the optical modulator are provided, plurality of optical modulator holders each being the optical modulator holder are provided respectively corresponding to the plurality of optical modulators, the optical device includes: an color-combining optical device which has plurality of light-incident sides where the plurality of optical modulator holders are provided and combines light beam modulated by each of the plurality of optical modulators; a fluid branch unit which is provided on a flow path of the cooling fluid in the plurality of fluid circulators and branches the cooling fluid inside and feeds the cooling fluid into each of the optical modulator cooling units included in the plurality of optical modulator holders; and a fluid feed-in unit which is provided on the flow path of the cooling fluid in the plurality of fluid circulators to feed all the cooling fluid discharged from each of the optical modulator cooling units together, the fluid branch unit attached to any one of those end surfaces crossing the plurality of light-incident sides of the color-combining optical device, and the fluid feed-in unit attached to any other one of the end surfaces crossing the plurality of light-incident sides of the color-combining optical device.

According to the present invention, the fluid branch unit included in the optical device branches and feeds the cooling fluid inside, for every one of the plurality of optical modulator cooling units. Therefore, the temperature of the cooling fluid flowing into the plurality of optical modulator cooling units is not biased but the optical modulators can be cooled by cooling fluid having a substantially uniform temperature.

In addition, since cooling fluid is enclosed not only in the optical modulator cooling units and the plurality of fluid circulators but also in the fluid branch unit and the fluid feed-in unit, the capacity of the cooling fluid can be increased. Thus, heat exchange capability between the optical modulator and the cooling fluid can be improved.

Further, the fluid branch unit and the fluid feed-in unit are attached respectively to those end surfaces of the color-combining optical device that cross plurality of light-incident sides. Therefore, if the plurality of optical modulators are provided, the optical device can be compact, and thus, downsizing of the optical device can be promoted.

Further, when each of the optical modulator cooling units is connected to other components such as a radiator, fluid pump, and the like, it is only necessary to connect the fluid branch unit and the fluid feed-in unit with said other components through fluid circulators. It is unnecessary to connect the optical modulator cooling units directly to said other components through fluid circulators. Therefore, the fluid circulators can be installed with ease.

Preferably, in the optical device according to the present invention, the fluid branch unit and the fluid feed-in unit are formed with heat-conductive material, and each have plurality of holder installation surfaces corresponding to the plurality of light-incident sides of the color-combining optical device, and the plurality of optical modulator holders are respectively attached heat-transferably to the plurality of holder unit installation surfaces, with the pairs of upright parts of the optical modulator holding units being arranged so as to cross over the holder unit installation surfaces of the fluid branch unit and the holder unit installation surfaces of the fluid feed-in unit.

In the present invention, the optical modulator holders are attached respectively to plurality of holder installation surfaces of the fluid branch unit as well as plurality of holder installation surfaces of the fluid feed-in unit, such that each pair of upright parts of the optical modulator holding units cross over a holder installation surface of the fluid branch unit and a holder installation surface of the fluid feed-in unit. Therefore, when each of the optical modulator holder is set in the optical device, the open part of the rectangular U-shape of each optical modulator holding unit can be closed by a holder installation surface of the fluid branch unit, a light-incident side of the color-combining optical device, and a holder installation surface of the fluid feed-in unit. A cylindrical space is defined by the optical modulator holder, fluid branch unit, and color-combining optical device. As a result, a structure in which cooling air is let flow through the space by a cooling fan or the like can be achieved as described above. Thus, heat release surfaces can be extended in a very natural manner, so that the optical modulators can be cooled much more efficiently.

In addition, the fluid branch unit and the fluid feed-in unit are made of heat-conductive material, and the pairs of upright part of the optical modulator holding units are attached heat-transferably to the fluid branch unit and the fluid feed-in unit. Therefore, it is possible to maintain securely a heat-transfer path through which the heat transmitted from the optical modulators to the optical modulator holding units is transmitted to the fluid branch unit and the fluid feed-in unit and further to the cooling fluid in the fluid branch unit and the fluid feed-in unit. Thus, the cooling efficiency of the optical modulator can be improved.

Preferably in the optical device according to the present invention, the fluid branch unit and the fluid feed-in unit are constituted by heat-conductive material, and each have plurality of holder unit installation surfaces corresponding to the plurality of light-incident sides of the color-combining optical device, the optical device has plurality of optical converter which converts optical characteristics of incident light beam, the optical converter each are constituted by a light-transmissive board having thermal conductivity, and an optical conversion film which is provided on the light-transmissive board and transforms optical characteristics of the incident light beam, and the plurality of optical converter are respectively attached heat-transferably to the plurality of holder unit installation surfaces, with the light-transmissive boards being arranged so as to cross over the holder unit installation surfaces of the fluid branch unit and the holder unit installation surfaces of the fluid feed-in unit.

Examples of the optical modulators described above may be retardation plates, polarization plates, field-angle correction plates, or the like.

In the present invention, the fluid branch unit and the fluid feed-in unit are made of heat-conductive material. In addition, the plurality of optical converter forming part of the optical device are attached heat-transferably to the plurality of holder installation surfaces of the fluid branch unit as well as the plurality of holder installation surfaces of the fluid feed-in unit, such that the light-transmissive boards having thermally conductivity cross over the holder installation surfaces of the fluid branch unit as well as the holder installation surfaces of the fluid feed-in unit. As a result of this, the heat generated at the optical conversion films by light beam irradiated from the light source can be transmitted to the cooling fluid in the fluid branch unit and the fluid feed-in unit through the light-transmissive boards. Accordingly, the cooling efficiency can be improved with respect to not only the optical modulators but also the plurality of optical converter.

Preferably, the optical device according to the present invention further has plurality of reflective polarizer which are respectively attached to the light-incident sides of the color-combining optical device, and respectively allow light beam having predetermined polarization axes to be transmitted and reflect light beam having any other polarization axis than the predetermined polarization axes, of light beam emitted from the plurality of optical modulators, in which the reflective polarizer each reflect the light beam having said any other polarization axis in such a direction as to avoid the image formation areas of the optical modulators.

Examples of the reflective polarizer are reflective polarizer made of organic material, reflective polarizer made of inorganic material, or the like.

In the present invention, each reflective polarization element reflects light beam that has a polarization axis different from a predetermined polarization axis. Therefore, heat is less generated, compared with an absorptive polarization element which absorbs light beam that has a polarization axis different from a predetermined polarization axis. As a result, the temperature of the reflective polarization element itself can be reduced. It is hence unnecessary to adopt a structure as described above of heat-transferably attaching the reflective polarizer to the fluid branch unit and the fluid feed-in unit made of heat-conductive material. In place of such a structure, a structure of attaching the reflective polarizer to the light-incident sides of the color-combining optical device can be adopted.

In addition, since the temperature of the reflective polarization element itself can be reduced, there is less possibility that heat of the reflective polarizer is transmitted to the optical modulator, compared with a structure which uses absorptive polarizer. Thus, optical modulator can be cooled efficiently.

Further, the reflective polarizer each reflect light beam having a different polarization axes from the predetermined polarization axis, in a direction in which reflected light avoids the image formation area of the optical modulator. Therefore, stray light does not appear in the optical device, and as a result, optical images formed by the optical modulators can be maintained stable. Excellent optical images can thus be formed.

Preferably in the optical device according to the present invention, each of the reflective polarizer is constituted by plurality of prisms connected to each other, and a reflective polarization film which is inserted between the plurality of prisms and allows light beam having a predetermined polarization axis to be transmitted and reflects light beam having any other polarization axis than the predetermined polarization axis, of light beam emitted from the optical modulators, the plurality of prisms respectively include incident-side prisms having light-incident sides serving as transmissive surfaces which are provided on light-incident sides and transmit light beam emitted from the optical modulators, and also serving as totally-reflective surfaces which reflect whole light beam reflected by the reflective polarization films, and the incident-side prisms respectively reflect the light beam reflected by the reflective polarization films, on the totally-reflective surfaces, and emit the light beam reflected, in such directions as to avoid the image formation areas of the optical modulators.

According to the present invention, the reflective polarizer has a plurality of prisms, and a reflective polarization film. Of the plurality of prisms, the prism situating on the light-incident side reflects the light beam reflected by the reflective polarization film, on the totally reflective surface, and emits the reflected light beam in a direction in which the reflected light avoids the image formation area of a corresponding optical modulator. Therefore, it is possible to avoid occurrence of stray light in the optical device, with a simple structure.

Preferably, the optical device according to the present invention includes a fluid pressure-feed unit provided in the flow path of cooling fluid in the plurality of fluid circulators, pressure-feeds the cooling fluid into the optical modulator cooling units forming part of the optical modulator holders, through the plurality of fluid circulators, to forcedly circulate the cooling fluid.

According to the present invention, the optical device has a fluid pressure-feed unit. Therefore, cooling fluid inside the optical modulators, which has been heated by the optical modulators, are let flow to outside, and cooling fluid outside is let flow into the optical modulator cooling units. Thus, the cooling fluid inside the optical modulator cooling units can be exchanged steadily. As a result, a constantly great temperature difference can be securely maintained between the optical modulators and the cooling fluid, so that the heat-exchange efficiency between the cooling fluid and the optical modulators can be improved much more.

Preferably in the optical device according to the present invention, the optical modulators each include a drive board having plurality of signal lines, switching elements connected to the plurality of signal lines, and plurality of pixel electrodes connected to the plurality of switching elements, an opposite board opposed to the drive board and having a common electrode, liquid crystal enclosed between the drive board and the opposite board, a circuit board electrically connected to the plurality of signal lines and the common electrode and protruding from between the drive board and the opposite board, and a pair of light-transmissive board stuck to outer surfaces of the drive board and the opposed board and having thermal conductivity, and in the rectangular plate-like member of each of the optical modulator holding units forming part of the optical modulator holder and the plate-like member, the peripheries of the openings respectively contact heat-transferably the pair of light-transmissive boards of the optical modulators, thus holding one of the optical modulators inside the rectangular U-shape of the optical modulator holding unit.

According to the present invention, in the optical modulator holding unit and the plate-like member forming part of each optical modulator holder, peripheries of openings respectively contact heat-transferably a pair of light-transmissive boards having thermally conductivity. Therefore, heat generated at the optical modulator can be excellently transmitted to the optical modulator holding unit and the plate-like member through the pair of light-transmissive boards. Thus, the cooling efficiency of the optical modulators can be improved.

Preferably in the optical device according to the present invention, in each of the optical modulators, one of the pair of light-transmissive boards is formed to have an outer shape larger than the other one of the pair of light-transmissive boards, thereby forming a step along a light-incident direction, and inner side surfaces forming a ring-like shape of each of the optical modulator cooling units are formed in a shape corresponding to the step, thereby to allow one of the optical modulators to be fit in.

According to the present invention, the ring-like inner side surfaces of each optical modulator cooling unit are formed in a shape which fits the step of the optical modulator along the light-incident direction, to allow an optical modulator to be engaged in. Therefore, installation of the optical modulators into the optical modulator cooling units can be carried out with ease. That is, work for assembling the optical modulators into the optical modulator holders can be carried out easily.

Preferably in the optical device according to the present invention, in a state in which the optical modulator is engaged in the optical modulator cooling unit, the circuit board is bent along a ring-like inner side surface of the optical modulator cooling unit, and is arranged along a light-incident side or light-irradiation side of the optical modulator cooling unit.

According to the present invention, for example, there can be a case that in each of the optical modulator cooling units, an inlet port and/or an outlet port is formed in the extending direction of the circuit board, and another end of a fluid circulator having one end connected and communicating with the inlet port and/or outlet port is protruded toward the light-irradiation side of the optical modulator cooling unit. In this case, if the circuit board is bent toward the light-incident side along the ring-like inner side surface of the optical modulator cooling unit and further along the light-incident side of the optical modulator cooling unit in a state in which the optical modulator is fit in the optical modulator cooling unit, the circuit board and the fluid circulator do not interfere with each other. Accordingly, work for assembling the optical device can be carried out easily. This case also applies, in a substantially similar manner, to another case in which said another end of the fluid circulator is formed to be protruded toward the light-incident side of the optical modulator cooling unit.

A projector according to the present invention is characterized by having a light source device, the optical device described above, and a projection optical device which magnifies and projects an optical image formed by the optical device.

According to the present invention, the projector has a light source device, the optical device described above, and a projection optical device. The same operation and effects as those of the optical device can be attained.

In addition, since the projector has an optical device capable of efficiently cooling optical modulators, thermal deterioration of the optical modulators can be prevented, and lifetime of the projector can be extended.

Further, the projector has an optical device capable of stably maintaining optical images formed by the optical modulators. Excellent optical images can be projected through the projection optical device.

DETAILED DESCRIPTION OF PREFERRED EMBODIMENTS

[First Exemplary Embodiment]

The first exemplary embodiment of the present invention will now be described with reference to the attached drawings.

[Structure of Projector]

Figure 1:
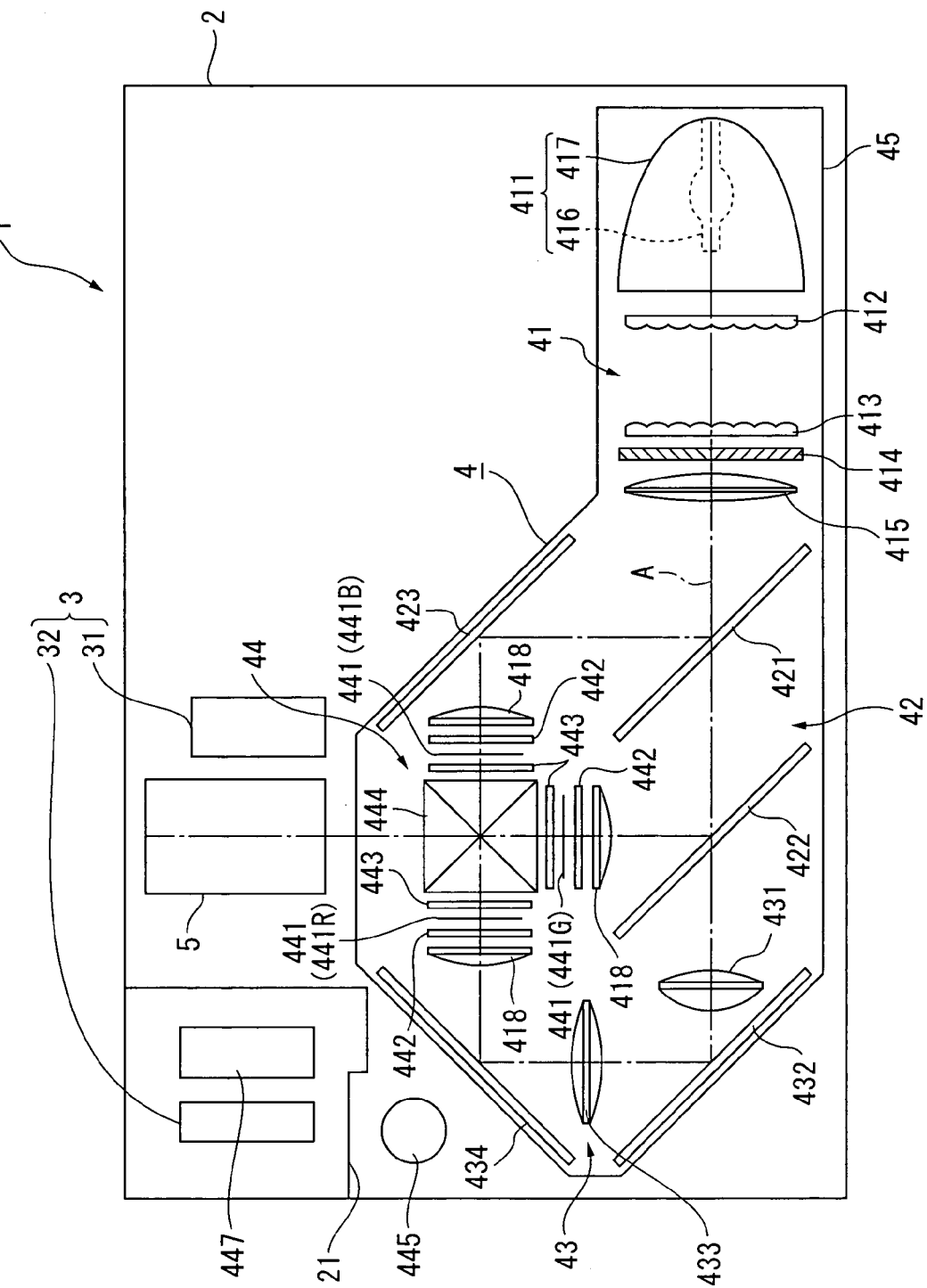
FIG. 1 is a diagram showing a schematic structure of a projector in a first exemplary embodiment.

FIG. 1 schematically shows the structure of a projector 1. The projector 1 modulates light beam emitted from a light source in accordance with image information to form optical images, and projects the formed images onto a screen in an enlarged manner. The projector 1 has an exterior casing 2, a cooling unit 3, an optical unit 4, and a projection lens 5 as a projection optical device.

Although not shown in FIG. 1, a power supply block, a lamp drive circuit, and the like are provided in the other space in the exterior casing 2 than areas occupied by the cooling unit 3, optical unit 4, and projection lens 5.

The exterior casing 2 is made of synthetic resins or the like and is formed in a substantial rectangular shape containing the cooling unit 3, optical unit 4, and projection lens 5 provided inside. Although not shown, the exterior casing 2 is constituted by an upper casing which forms part of the top, front, back, and lateral sides of the projector 1, and a lower casing which forms part of the bottom side, front, back, and lateral sides of the projector 1 as well. The upper and lower casings are fixed to each other by screws and the like.

The material of the exterior casing 2 is not limited to synthetic resins but may be any other materials, e.g., metal or the like.

Although not shown as well, air intake vent (e.g., an air intake vent 22 shown in FIG. 2) for introducing cooling air from outside the projector 1 by the cooling unit 3, and air exhaust hole for discharging air heated in the projector 1 are formed in the exterior casing 2.

Further, a partition 21 provided at a corner of the exterior casing 2 on one side of the projection lens 5 and isolating a radiator of an optical device (described later) of the optical unit 4 from other components is formed in the exterior casing 2, as shown in FIG. 1.

The cooling unit 3 sends cooling air into a cooling flow path formed in the projector 1 to cool heat generated in the projector 1. The cooling unit 3 has a sirocco fan 31 and an axial flow fan 32. The sirocco fan 31 is positioned on one side of the projection lens 5 and guides cooling air to inside from outside the projector 1 though the intake vents (not shown) to blow the cooling air to liquid crystal panels of the optical device described later. The axial flow fan 32 is positioned on an inner side of the partition 21 formed in the exterior casing 2, and guides cooling air to inside from outside the projector 1 through the air intake vent 22 (see FIG. 2) cut in the exterior casing 2, to blow the cooling air to the radiator described later of the optical unit 4.

In addition to the sirocco fan 31 and axial flow fan 32, the cooling unit 3 further has a light source device described later of the optical unit 4, a power supply block not shown, and a cooling fan for cooling a lamp drive circuit and the like although not shown.

The optical unit 4 optically processes light beam emitted from the light source to form an optical image (color image) in accordance with image information. As shown in FIG. 1, the optical unit 4 has a substantially L-shaped form in a plan view, which extends along both the back and one lateral side of the exterior casing 2. Details of the structure of the optical unit 4 will be described later.

The projection lens 5 is constructed as a lens set consisting of plural lenses combined together. The projection lens 5 projects the optical image (color image) formed by the optical unit 4 onto a screen (not shown) in an enlarged manner.

[Details of Structure of Optical Unit]

As shown in FIG. 1, the optical unit 4 includes: an integrator illuminating optical system 41, a color separating optical system 42; a relay optical system 43; an optical device 44; and an optical component housing 45 which contains and positions those optical components 41 to 43, an optical device body (described later) of the optical device 44, and the incident-side polarization plate.

The integrator illuminating optical system 41 serves to illuminate substantially uniformly image formation areas of liquid crystal panels (described later) of the optical device 44. The integrator illuminating optical system 41 has a light source device 411, a first lens array 412, a second lens array 413, a polarization converter 414, and a superposing lens 415, as shown in FIG. 1.

The light source device 411 has a light source lamp 416 which emits a radial beam, and a reflector 417 which reflects the radial beam emitted from the light source lamp 416. As the light source lamp 416, a halogen lamp, metal halide lamp, or high-pressure mercury lamp is used in many cases. The reflector 417 in FIG. 1 employs a parabolic mirror. However, the reflector 417 is not limited thereto but may employ an ellipsoidal mirror in a structure using a parallelizing concave lens on the light-irradiation side, which converts light beam reflected by the ellipsoidal mirror into parallelized light beams.

The first lens array 412 has a structure in which small lenses are arranged in a matrix. The small lenses each have a substantially rectangular profile when viewed in the optical axis direction. Also, the small lenses divide the light beam emitted from the light source device 411 into a plurality of sub-beams of partial light beam.

The second lens array 413 has a similar structure to that of the first lens array 412, i.e., small lenses are arranged in a matrix. The second lens array 413 together with the superposing lens 415 functions to focus images from the respective small lenses of the first lens array 412 onto the liquid crystal panels (described later) of the optical device 44.

The polarization converter 414 is positioned between the second lens array 413 and the superposing lens 415, and converts light from the second lens array 413 into substantially uniformed polarized light.

Specifically, each sub-beam converted into substantially uniformed polarized light by the polarization converter 414 is substantially superposed on the liquid crystal panels (described later) of the optical device 44 by the superposing lens 415. Since a projector using liquid crystal panels that modulates polarized light can use only uniform polarized light, only substantial half of the light from the light source device 411 which emits random polarized light can be used. Hence, the polarization converter 414 is used to transform the light emitted from the light source device 411 into substantially uniformed polarized light to improve utilization efficiency of light in the optical device 44.

The color separating optical system 42 has two dichroic mirrors 421 and 422, and a reflection mirror 423, as shown in FIG. 1. These system 42 functions to separate the plurality of sub-beams irradiated from the integrator illuminating optical system 41 into three color lights of red, green, and blue, by the dichroic mirrors 421 and 422.

The relay optical system 43 has an incident-side lens 431, a relay lens 433, and reflection mirrors 432 and 434, as shown in FIG. 1, and functions to guide the red light separated by the color separating optical system 42 to a liquid crystal panel for red light (described later) in the optical device 44.

At this time, the dichroic mirror 421 of the color separating optical system 42 reflects the blue light component of the light beam irradiated from the integrator illuminating optical system 41, and transmits the red and green light components. The blue light thus reflected by the dichroic mirror 421 is further reflected by the reflection mirror 423, passes through a field lens 418, and reaches a liquid crystal panel for blue light (described later) in the optical device 44. The field lens 418 converts each of the sub-beams irradiated from the second lens array 413 into the light beam parallel to the center axis (main beam). The field lenses 418 provided on the light-incident sides of the other liquid crystal panels for green and red lights have the same function.

Of the red and green light which has passed through the dichroic mirror 421, the green light is reflected by the dichroic mirror 422, transmitted through the field lens 418, and reaches the liquid crystal panel for green light (described later) in the optical device 44. On the other side, the red light passes through the dichroic mirror 422, then the relay optical system 43, and further the field lens 418, and reaches the liquid crystal panel for red light (described later) in the optical device 44. The relay optical system 43 is used for red light because the light path of red light is longer than those of the other colored light so that deterioration of utilization efficiency of light due to diffusion of light or the like is prevented. That is, the sub-beams incident on the incident-side lens 431 should be directly transmitted to the field lens 418. In the present exemplary embodiment, this structure is employed because of the long light path of the red light. However, there can be another structure having a long light path for blue light.

As shown in FIG. 1, the optical device 44 has three liquid crystal panels 441 (441R for red light, 441G for green light, and 441B for blue light) as an optical modulator, three incident-side polarization plates 442 and three irradiation-side polarization plates 443 as optical converter respectively provided in the light-incident sides and the light-irradiation sides of the liquid crystal panels 441, and a cross dichroic prism 444 as a color-combining optical device. Among these components, the three liquid crystal panels 441, three irradiation-side polarization plates 443, and cross dichroic prism 444 are formed integrally. In the present exemplary embodiment, the three incident-side polarization plates 442 are separated from the three liquid crystal panels 441, three irradiation-side polarization plates 443, and cross dichroic prism 444, but the three incident-side polarization plates 442 may be integrated.

Although described later in detail, the optical device 44 has a main tank, a fluid pressure-feed unit, a radiator, fluid circulators, a fluid branch unit, an optical modulator holder, and a fluid feed-in unit, in addition to the liquid crystal panels 441, incident-side polarization plates 442, irradiation-side polarization plates 443, and cross dichroic prism 444.

The respective color lights with polarization direction aligned substantially into one direction by the polarization converter 414 are incident on incident-side polarization plates 442. Of these incident light beams, the incident-side polarization plates 442 transmits polarized light aligned substantially in the same direction as the polarization axis direction of the polarization light beam aligned by the polarization converter 414, and absorbs the other polarized light. Although not specifically shown, the incident-side polarization plates 442 each have a light-transmissive substrate made of sapphire glass or crystal on which a polarization film is coated.

Figure 2:
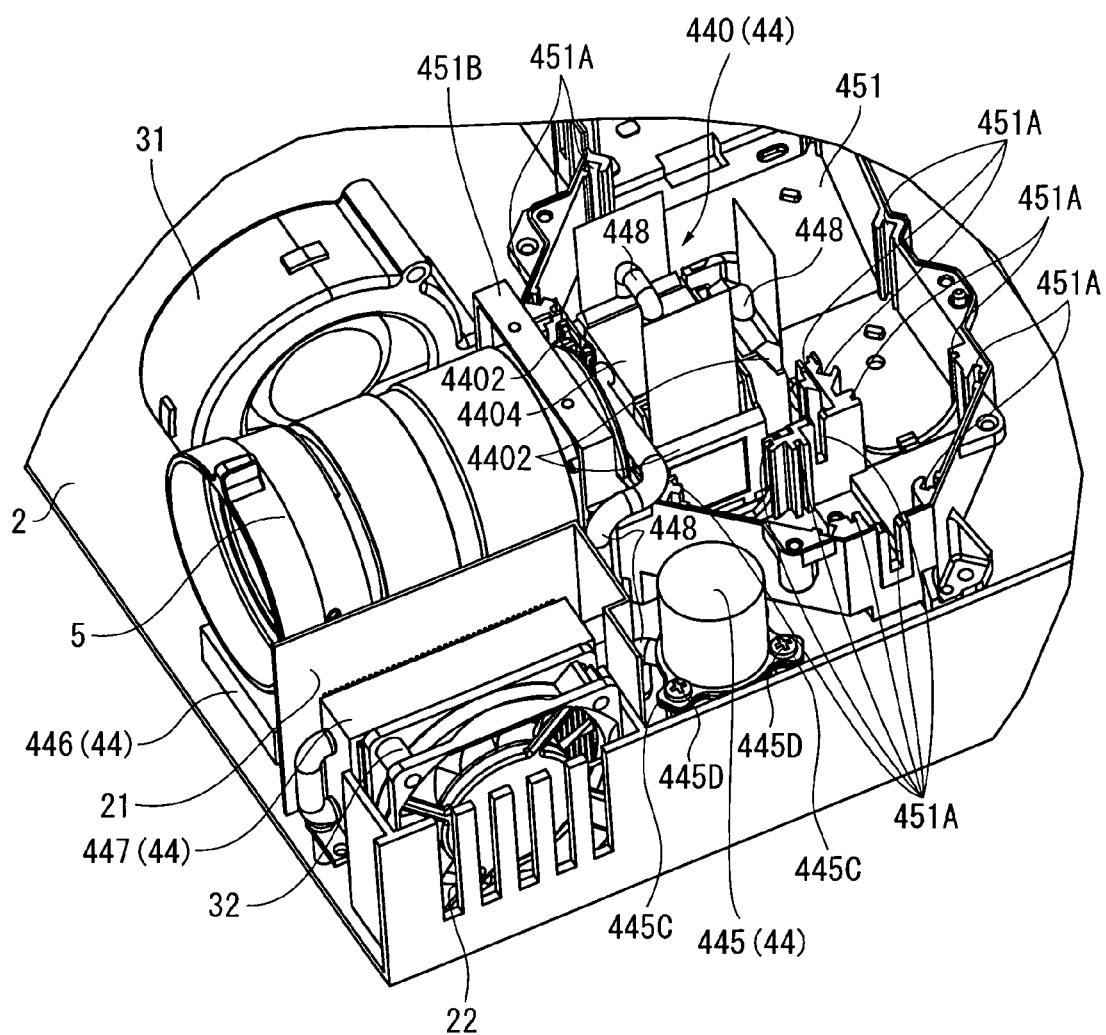
FIG. 2 is a perspective view of an inner part of the projector in the exemplary embodiment viewed from upside.

FIG. 2 is a perspective view showing an inner part of the projector 1 viewed from upside. Among optical components in the optical component housing 45, FIG. 2 shows only the optical device body (described later) of the optical device 44, and the other optical components 41 to 43 are not shown to simplify the description.

Figure 3:
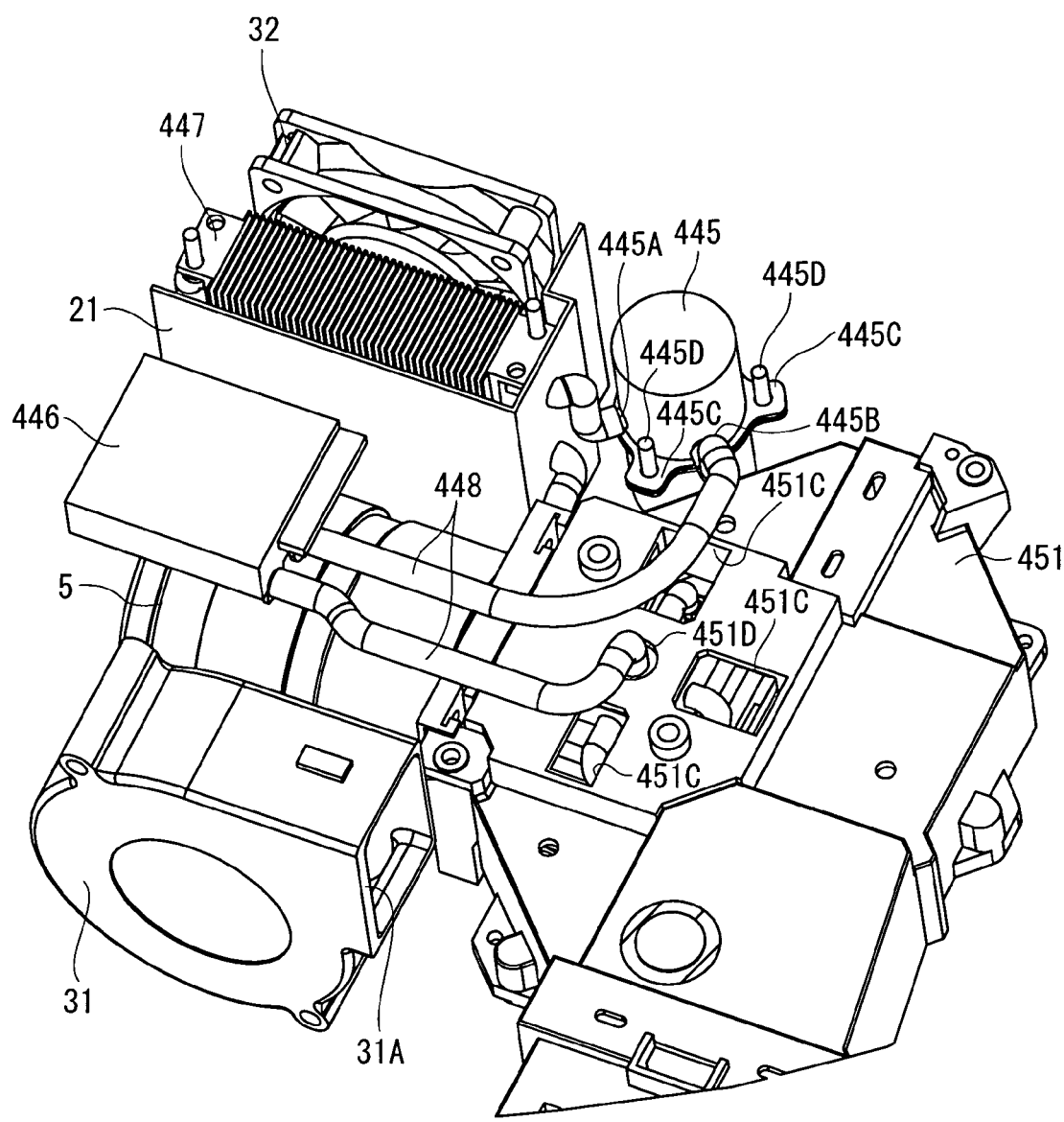
FIG. 3 is a perspective view of an inner part of the projector in the exemplary embodiment viewed from downside.

FIG. 3 is a perspective view of an inner part of the projector 1 viewed from downside.

The optical component housing 45 is made of, for example, metal materials. As shown in FIG. 1, a predetermined optical illumination axis A is defined inside the optical component housing 45, and the foregoing optical components 41 to 43 and 442 and the optical device body (described later) of the optical device 44 are also contained therein and arranged at predetermined positions relative to the optical illumination axis A. The material of the optical component housing 45 is not limited to metal but may be other materials, preferably, materials having thermal conductivity. As shown in FIG. 2, the optical component housing 45 is constituted by a container-like component container 451 which contains the optical components 41 to 43 and 442 and the optical device body (described later) of the optical device 44, and a cover member not shown which closes open part of the component container 451.

Of these members, the component container 451 forms the bottom side, front, and lateral sides of the optical component housing 45.

As shown in FIG. 2, grooves 451A for slidably fitting the foregoing optical components 412 to 415, 418, 421 to 423, 431 to 434, and 442 from upside are formed in the inner surfaces of the sides in the component container 451.

At a front part of the lateral side, as shown in FIG. 2, a projection lens installation unit 451B is provided to set the projection lens 5 at a predetermined position relative to the optical unit 4. The projection lens installation unit 451B is formed to have a substantially rectangular shape in its plan view. At the substantial center in the plan view, a circular hole (not shown) is formed in correspondence with a light-irradiation position of the optical device 44. A color image formed by the optical unit 4 is projected through the hole in an enlarged manner by the projection lens 5.

In the bottom side of this component container 451, three holes 451C formed corresponding to the position of the liquid crystal panel 441 of the optical device 44, and a hole 451D formed corresponding to a cooling fluid inflow part of a fluid branch part (described later) of the optical device 44 are provided, as shown in FIG. 3. Cooling air introduced from outside the projector 1 by the sirocco fan 31 of the cooling unit 3 is discharged from a discharge vent 31A of the sirocco fan 31 (FIG. 3) and then guided to the hole 451C through a duct not shown.

[Structure of Optical Device]

As shown in FIG. 2 or 3, the optical device 44 has the optical device body 440 (FIG. 2) in which the liquid crystal panels 441, irradiation-side polarization plates 443, and cross dichroic prism 444 are integrated, the main tank 445, fluid pressure-feed unit 446, radiator 447, and plural fluid circulators 448.

The plural fluid circulators 448 are tubular members made of aluminum in which cooling fluid can convect. These plural fluid circulators 448 connect the respective members 440 and 445 to 447 such that the cooling fluid can circulate. Heat generated from the liquid crystal panels 441 and irradiation-side polarization plates 443 of the optical device body 440 is cooled by the circulating cooling fluid.

In the present exemplary embodiment, ethylene glycol which is a transparent non-volatile liquid is used as the cooling fluid. The cooling fluid is not limited to ethylene glycol but any other liquid may be used.

Hereinafter, the members 440 and 445 to 447 will be descried in order from the upstream side relative to the liquid crystal panels 441 along the flow path of the circulating cooling fluid.

[Structure of Main Tank]

Figure 4A:
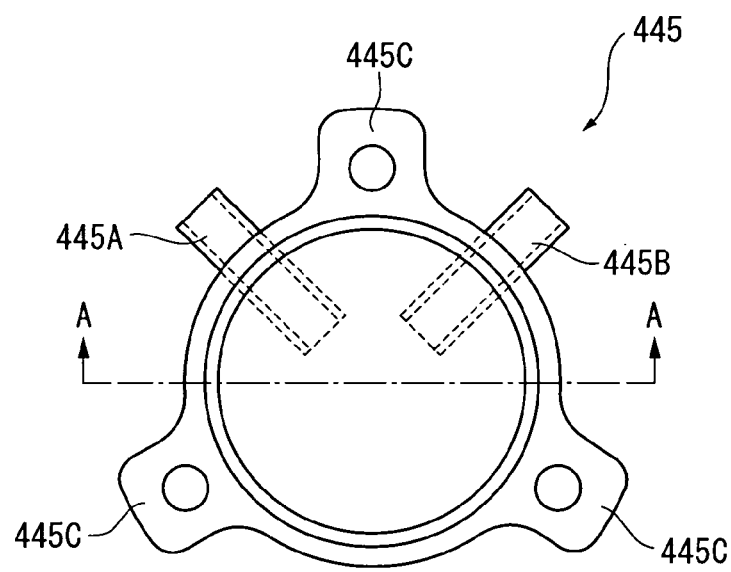
FIG. 4A is a plan view showing the structure of a main tank in the exemplary embodiment.
Figure 4B:
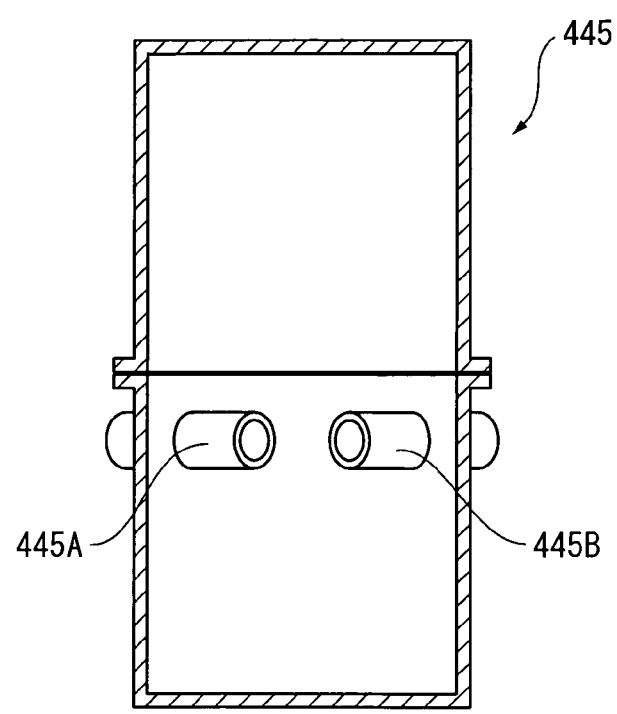
FIG. 4B is a cross-sectional view showing a section cut along line A—A in FIG. 4A.

FIGS. 4A and 4B are views showing the structure of the main tank 445. More specifically, FIG. 4A is a plan view of the main tank 445 viewed from upside. FIG. 4B shows a cross-section cut along the line A—A in FIG. 4A.

The main tank 445 has a substantially cylindrical shape and is constituted by two aluminum container-like members. Opening parts of the two container-like members are joined to each other thereby to store temporarily the cooling fluid. These container-like members are joined, for example, by seal-welding or inserting an elastic member made of rubber or the like.

A cooling fluid inflow part 445A for allowing the cooling fluid to flow in and a cooling fluid outflow part 445B for allowing the fluid to flow out are formed at a substantial center part of the main tank 445 in the cylinder axis direction.

The cooling fluid inflow part 445A and outflow part 445B are made of substantially cylindrical members having a smaller pipe diameter than that of the cooling fluid circulators 448, and are provided protruding toward inside and outside of the main tank 445. Further, an outwardly protruding end of the cooling fluid inflow part 445A is connected to an end of a fluid circulator 448. The cooling fluid flows from outside into the main tank 445 through the fluid circulator 448. On the other side, an outwardly protruding end of the cooling fluid outflow part 445B is also connected to an end of another fluid circulator 448. The cooling fluid flows from inside the main tank 445 to the outside through the fluid circulator 448.

The other outwardly-protruding ends of the cooling fluid inflow part 445A and outflow part 445B extend toward the cylindrical axis of the main tank 445 as shown in FIG. 4A, and are positioned to be substantially perpendicular to each other in a plan view. Since the cooling fluid inflow part 445A and outflow part 445B are thus positioned substantially at right angles to each other on a plane view, the cooling fluid which has once flowed into the main tank 445 through the cooling fluid inflow part 445A can be prevented from immediately flowing out through the cooling fluid outflow part 445B. Accordingly, the cooling fluid flowing in is mixed with the cooling fluid which has been staying in the main tank 445 to make the temperature of the entire cooling fluid uniform.

Three fixing parts 445C for each of the two container-like members are formed on the outer circumferential surface of the main tank 445 at a substantial center part thereof in the cylindrical axis direction, as shown in FIG. 4A. Screws 445D (FIGS. 2 and 3) are inserted through the fixing parts 445C and screwed into the bottom side of the exterior casing 2. Thus, the two container-like members are connected tightly to each other, and the entire main tank 445 is fixed to the exterior casing 2.

Further, as shown in FIG. 1 or 2, the main tank 445 are positioned in an area which appears to be a triangle on a plan view, defined by the optical component housing 45 and inner side surfaces of the exterior casing 2. Since the main tank 445 is placed in this area, the space efficiency of the exterior casing 2 is improved so that the projector 1 might not have a larger size.

[Structure of Fluid Pressure-Feed Unit]

The fluid pressure-feed unit 446 is fed with the cooling fluid stored in the main tank 445 and forcibly feeds out the fed cooling fluid. Therefore, as shown in FIG. 3, the fluid pressure-feed unit 446 is connected to and communicates with the other end of a fluid circulator 448 connected to the cooling fluid outflow part 445B of the main tank 445, and the other end of another fluid circulator 448 connected to the cooling fluid inflow part 445A to send out the cooling fluid to the outside.

Although not specifically shown in the figures, the fluid pressure-feed unit 446 has a structure in which, for example, an impeller is provided in a substantially rectangular hollow member made of aluminum. Under control from a control device not shown, the impeller rotates to forcibly introduce the cooling fluid stored in the main tank 445 into the unit itself through a fluid circulator 448 and to forcibly send out to the outside through another fluid circulator 448. In this structure, the impeller of the fluid pressure-feed unit 446 can have such a small thickness size in the rotation axis direction that the unit 446 can be placed in a free space in the projector 1. Accordingly, the space efficiency inside the projector 1 is improved so that the size of the projector 1 need not to be enlarged. In the present exemplary embodiment, the fluid pressure-feed unit 446 is positioned below the projection lens 5, as shown in FIG. 2 or 3.

[Structure of Optical Device Body]

Figure 5:
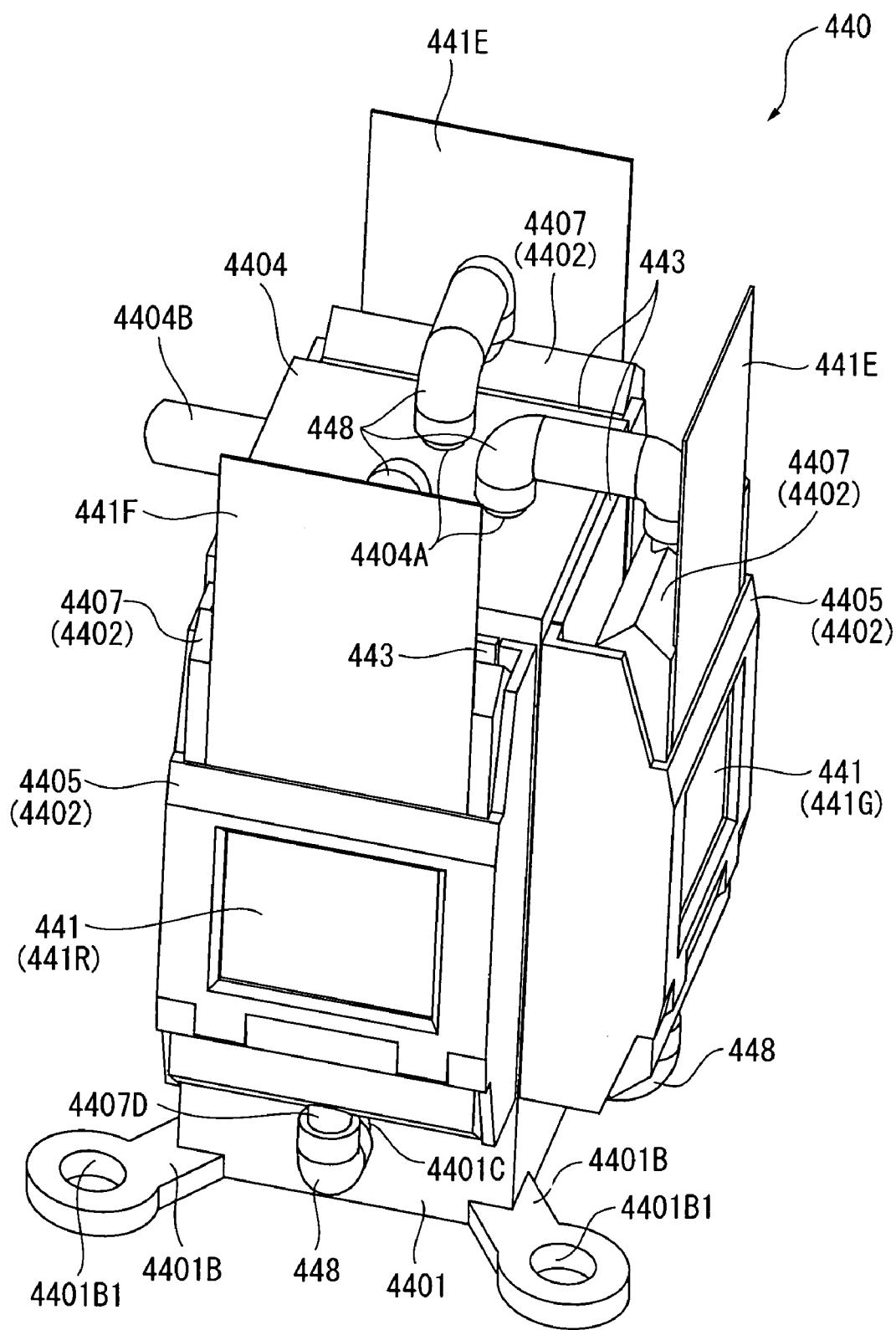
FIG. 5 is a perspective view showing a schematic structure of the whole optical device body in the exemplary embodiment.

FIG. 5 is a perspective view schematically showing the structure of the optical device body 440.

Figure 6:
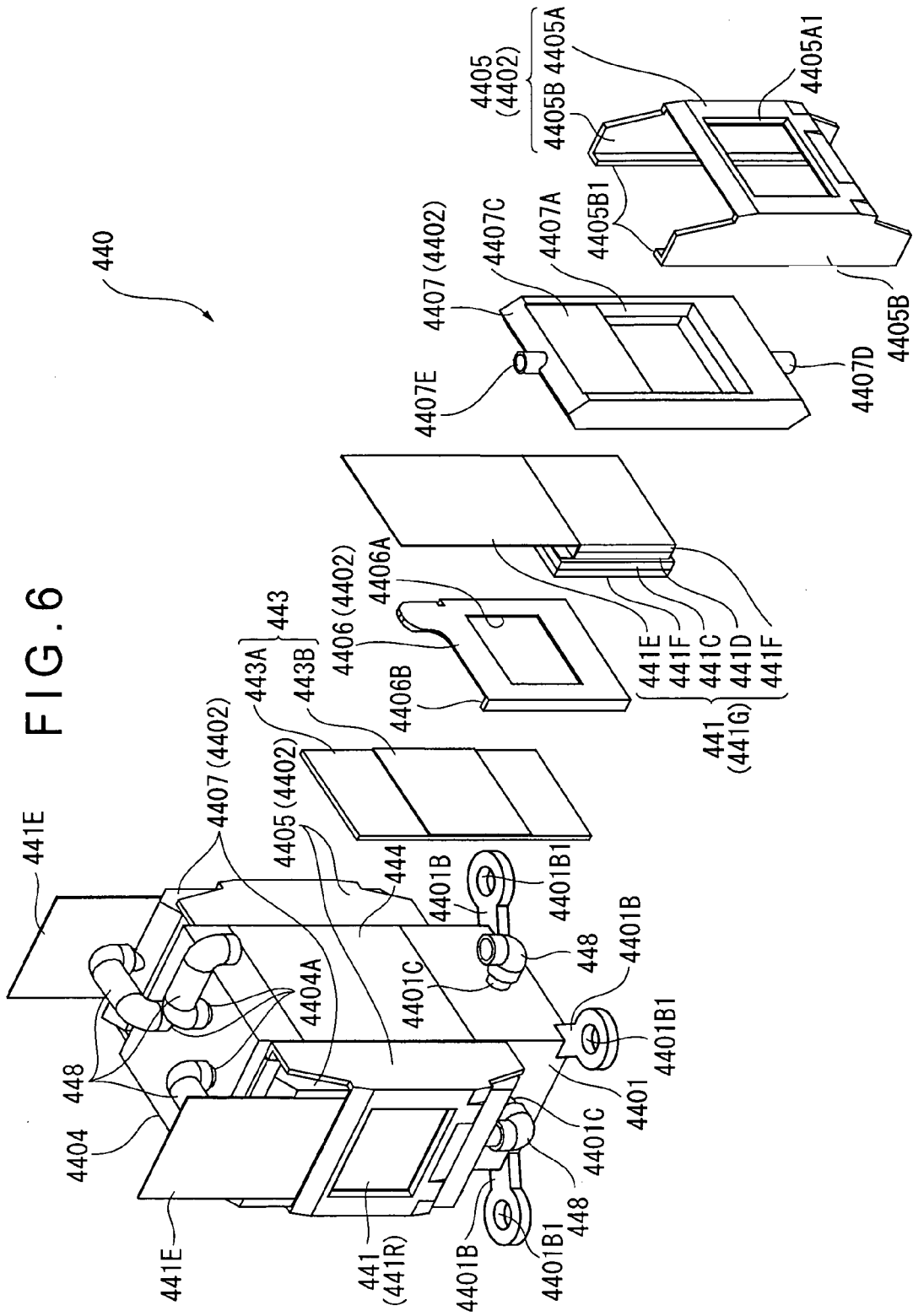
FIG. 6 is an exploded perspective view showing a schematic structure of the optical device body in the exemplary embodiment.

FIG. 6 is an exploded perspective view schematically showing the structure of the optical device body 440. In FIG. 6, only a part of the structure on the green light side is exploded to simplify the description. The other parts of the structure on the red and blue light sides are the same as that on the green light side.

As shown in FIGS. 5 and 6, the optical device body 440 has three liquid crystal panels 441, three irradiation-side polarization plates 443, a cross dichroic prism 444 (FIG. 6), a fluid branch unit 4401, three optical modulator holders 4402, and a fluid feed-in unit 4404.

[Structure of Liquid Crystal Panel]

The liquid crystal panels 441 each have a structure in which liquid crystal as electro-optic material is enclosed and sealed between a pair of boards 441C and 441D made of glass or the like. Of the boards, the board 441C is a drive board for driving liquid crystal, and has plural data lines formed and arrayed in parallel with each other, plural scan lines formed and arrayed in a direction perpendicular to the plural data lines, pixel electrodes formed and arrayed in a matrix corresponding to intersections between the scan lines and the data lines, and switching elements such as TFT. On the other side, the board 441D is an opposite board opposed to the board 441C at a predetermined interval, and has a common electrode applied with a predetermined voltage Vcom. These boards 441C and 441D are connected to a flexible printed board 441E as a circuit board, which is electrically connected to a control device not shown and also outputs predetermined drive signals to the scan lines, data lines, switching elements, and common electrode. By inputting drive signals via the flexible printed board 441E from the control device, voltage is applied between the pixel electrodes and the common electrode, so that orientation of liquid crystal existing between the pixel electrodes and the common electrode is controlled. As a result, the polarization direction of polarized light beam irradiated from the incident-side polarization plate 442 is modulated. Further, a pair of dust-proof glasses 441F as light-transmissive boards having thermal conductivity are attached on the outer surfaces of the boards 441C and 441D. Even when dust particles adhere to the outer surface of the liquid crystal panel 441, those particles are out of the focus position because of the pair of dust-proof glass 441F. For example, sapphire, crystal, or the like may be used as the material forming the pair of dust-proof glass 441F.

Table 1 below shows material usable for the dust-proof glass 441F and characteristics of the material (thermal expansion coefficient and thermal conductivity).

TABLE 1

|  | thermal conductivity W/m · K | thermal expansion coefficient ×10$^{-6}$/K |
|---|---|---|
| Sapphire | 42 | 5.3 |
| Quartz | 1.2 | 0.58 |
| Crystal | 9.3 (parallel to optical axis direction) | 6.8 |
|  | 5.4 (perpendicular to optical axis direction) | 12.2 |

In this liquid crystal panels 441, the outer shape of the drive board 441C is set larger than that of the opposite board 441D. The drive board 441C and the dust-proof glass 441F attached on the board 441C are arranged to have substantially uniform outer shapes. Further, the opposite board 441D and the dust-proof glass 441F attached on the board 441D are also arranged to have substantially uniform outer shapes. That is, the liquid crystal panel 441 is formed to have a stepped outer shape which is downsized toward the light-incident side.

[Structure of Irradiation-side Polarization Plate]

As shown in FIG. 6, the irradiation-side polarization plate 443 has a light-transmissive board 443A and a polarization film 443B as an optical conversion film, like the incident-side polarization plate 442. Of the light beams irradiated from the liquid crystal panel 441, only the light beam having a polarization axis perpendicular to the light transmission axis of the incident-side polarization plate 442 is transmitted through the irradiation-side polarization plate 443. The other light beam is absorbed by the irradiation-side polarization plate 443.

Of these components, the outer shape of the light-transmissive board 443A are set to have a greater height than that of the cross dichroic prism 444, and a width size substantially equal to or smaller than that of the cross dichroic prism 444, as shown in FIG. 6.

With the optical device body 440 completely assembled, the irradiation-side polarization plate 443 is fixed, by a heat-conductive adhesion or the like, to an end surface of the cross dichroic prism 444 on the light-incident side and an end surface of the fluid feed-in unit 4404, bridging an end surface of the fluid branch unit 4401 and an end surface of the fluid feed-in unit 4404.

[Structure of Cross Dichroic Prism]

The cross dichroic prism 444 is an optical element which combines optical images respectively modulated for the respective colors and irradiated from the irradiation-side polarization plate 443 to form a color image. The cross dichroic prism 444 has a substantially square shape in a plan view in which four right-angle prisms are attached together. Two dielectric multi-layer films are formed at the interfaces among the attached right-angle prisms. These dielectric multi-layer films reflect the color lights irradiated from the liquid crystal panels 441R and 441B and transmitted through the irradiation-side polarization plates 443 while transmits the other color light irradiated from the liquid crystal panel 441G and transmitted through irradiation-side polarization plate 443. Thus, light of respective colors which has been modulated by the liquid crystal panels 441R, 441G, and 441B is thus combined, thereby forming a color image.

[Structure of Fluid Branch Unit]

The fluid branch unit 4401 is a substantially rectangular hollow member made of aluminum, which has substantially the same shape on a plan view as the upper or lower surface of the cross dichroic prism 444. The fluid branch unit 4401 introduces the cooling fluid forcibly send out of the fluid pressure-feed unit 446, and branches and sends out for each of three optical modulator holders 4402. The fluid branch unit 4401 is fixed to the lower surface of the cross dichroic prism 444 which is an end surface crossing other three light-incident sides thereof and also functions as a prism fixing plate to support the cross dichroic prism 444.

In this fluid branch unit 4401, a cooling fluid inflow part 4401A (see FIG. 9) to introduce the cooling fluid fed from the fluid pressure-feed unit 446 is provided at a substantial center part of the bottom side. Like the cooling fluid inflow part 445A of the main tank 445, the cooling fluid inflow part 4401A is constituted by a substantially cylindrical member having a smaller pipe diameter than that of the fluid circulator 448 and is protrude toward inside and outside of the fluid branch unit 4401 (see FIG. 9). An outwardly protruding end of the cooling fluid inflow part 4401A is connected to the outer end of the fluid circulator 448 connected to and communicating with the fluid pressure-feed unit 446. Via this fluid circulator 448, cooling fluid fed from the fluid pressure-feed unit 446 is introduced into the fluid branch unit 4401.

Arms 4401B extending along the bottom side are provided respectively at four corner parts of the bottom side as shown in FIGS. 5 and 6. Holes 4401B1 are respectively formed in tip ends of the arms 4401B. Screws not shown are inserted in these holes 4401B 1 and screwed in the component container 451 of the optical component housing 45. Thus, the optical device body 440 is fixed to the component container 451. At this time, the fluid branch unit 4401 and the optical component housing 45 are connected to be thermally transferable. By this thermally transferable connection of the fluid branch unit 4401 to the optical component housing 45, a heat transfer path is securely created from the cooling fluid to the fluid branch unit 4401 and to the optical component housing 45, so that the cooling efficiency of the cooling fluid improves. As a result, with respect to the liquid crystal panels 441 and the irradiation-side polarization plates 443, the cooling efficiency is improved by the cooling fluid. If the air sent from the sirocco fan 31 is fed along the bottom side surface of the optical component housing 45, the heat release area for the circulating cooling fluid is increased, and so, the cooling efficiency is further improved.

As also shown in FIGS. 5 and 6, cooling fluid outflow parts 4401C to branch send out the introduced cooling fluid to each of the three optical modulator holders 4402 are formed in the three side surfaces of the fluid branch unit 4401 that correspond to the light-incident sides of the cross dichroic prism 444. Although FIGS. 5 and 6 show only the cooling fluid outflow part 4401C on the R color light and G color light sides, another cooling fluid outflow part is provided on the B color light side.

Figure 9:
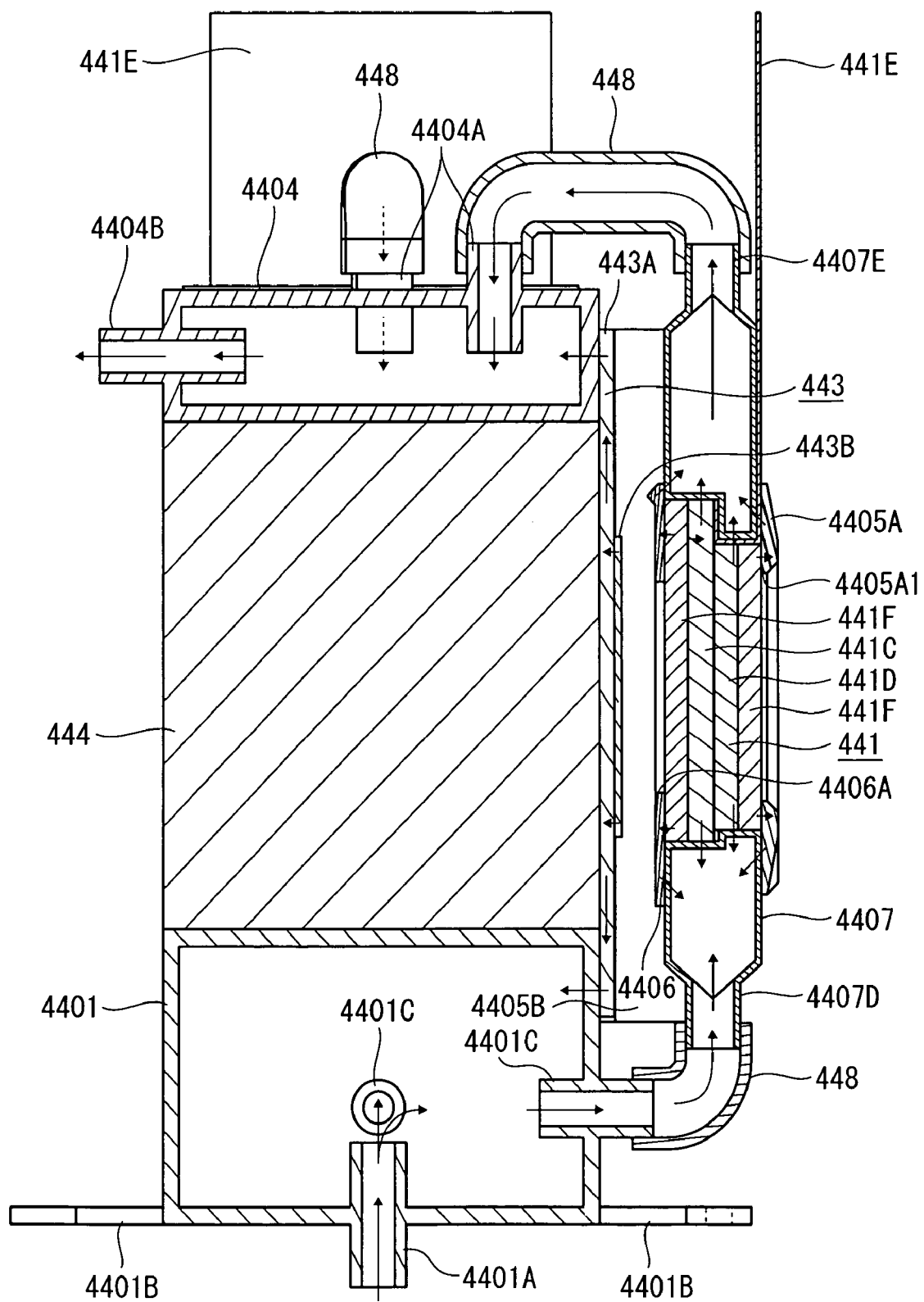
FIG. 9 is a view for explaining a cooling structure of a liquid crystal panel and an irradiation-side polarization plate in the above-mentioned exemplary embodiment.

Like the cooling fluid inflow part 4401A, the cooling fluid outflow parts 4401C each are constituted by a substantially cylindrical member having a smaller pipe diameter than that of the fluid circulator 448, and protrudes toward inside and outside of the fluid branch unit 4401 (see FIG. 9.) Outwardly protruding ends of the cooling fluid outflow parts 4401C are respectively connected to ends of the fluid circulators 448. Cooling fluid from inside the fluid branch unit 4401 are branched and discharged to the outside through the fluid circulators 448.

Although not specifically depicted in the drawings, a spherical bulged part is formed at a substantial center part of the upper side of the fluid branch unit 4401. Since the lower surface of the cross dichroic prism 444 contacts with the bulged part, posture in a tilting direction the cross dichroic prism 444 relative to the fluid branch unit 4401 can be adjusted.

[Structure of Optical Modulator Holder]

The three optical modulator holders 4402 respectively hold and cool the three liquid crystal panels 441. The optical modulator holders 4402 have identical structures, and therefore, only one of the holders 4402 will be described below.

As shown in FIG. 6, each optical modulator holder 4402 has an optical modulator holding unit 4405, a plate-like member 4406, and an optical modulator cooling unit 4407.

The optical modulator holding unit 4405 has a substantially rectangular U-shaped cross-section. A liquid crystal panel 441, the plate-like member 4406, and the optical modulator cooling unit 4407 are held inside the U-shape. The optical modulator holding unit 4405 includes a rectangular plate-like member 4405A and a pair of upright parts 4405B, which are formed integrally.

The rectangular plate-like member 4405A is a plate member having a substantially rectangular shape in plan view, which has a larger outer shape than that of the opposite board 441D of the liquid crystal panel 441, as shown in FIG. 6. An opening 4405A1 corresponding to the image formation area of the liquid crystal panel 441 is provided at a substantial center of the plate-like member.

As shown in FIG. 6, the pair of upright parts 4405B each has a substantially rectangular shape in a plan view, and are formed to protrude toward the light-incident side from both lateral side edges of the rectangular plate-like member 4405A which are side edges opposed to each other.

The pair of upright parts 4405B respectively protrude from the lateral side edges of the rectangular plate-like member 4405A to the light-irradiation side, and each have a shape extending up and down vertically, as shown in FIG. 6.

Of the pair of upright parts 4405B, tip end parts in the protruding direction have folded ribs 4405B1 which are bent toward opposite upright parts 4405B, as shown in FIG. 6.

With the optical device body 440 completely assembled, the optical modulator holding unit 4405 is installed such that the pair of upright parts 4405B extend across end surfaces of the fluid branch unit 4401 and the fluid feed-in unit 4404. Light-irradiation sides of the folded ribs 4405B1 are fixed, by a heat-conductive adhesion or the like, to an end surface of the fluid branch unit 4401, the light-incident side of the cross dichroic prism 444, and an end surface of the fluid feed-in unit 4404.

The plate-like member 4406 is a plate having a substantially rectangular shape in plan view, which has a larger outer shape than that of the drive board 441C of the liquid crystal panel 441, as shown in FIG. 6. An opening 4406A corresponding to the image formation area of the liquid crystal panel 441 is provided at a substantial center part of the member.

As shown in FIG. 6, a pair of folded parts 4406B are formed on lateral side edges of the plate-like member 4406, which are two opposite side edges thereof.

The outer dimension of the plate-like member 4406 in the lateral direction is set to be smaller than the dimension of the interval between the pair of upright parts 4405B of the optical modulator holding unit 4405. Thus, the plate-like member 4406 can be inserted from upside into inside of the rectangular U-shape of the optical modulator holding unit 4405.

In the present exemplary embodiment, the optical modulator holding units 4405 and plate-like members 4406 are made of iron-nickel alloy, such as invar and 42Ni—Fe. Material of the optical modulator holding units 4405 and plate-like members 4406, however, is not limited to iron-nickel alloy but may be magnesium alloy, aluminum alloy, heat-conductive resins, or the like. Also, the optical modulator holding units 4405 and plate-like members 4406 may be made of either single one or different ones of the material cited above.

Table 2 below shows material available for the optical modulator holding units 4405 and plate-like members 4406, and characteristics thereof (thermal conductivity and thermal expansion coefficient).

TABLE 2

| | Thermal conductivity W/m · K | Thermal expansion coefficient ×10$^{-6}$/K |
|---|---|---|
| Invar (Ni36-Fe) | 10.15 | 15 |
| 42Ni—Fe | 12.6 | 4.5 |
| Magnesium alloy (AZ91D) | 72 | 25 |
| Aluminum alloy (380AL) | 96 | 21.8 |
| Heat-conductive resins (Cool Poly D2 (commercial name)) | 15 | 4 (parallel to fiber direction) 10 (perpendicular to fiber direction) |

Figure 7:
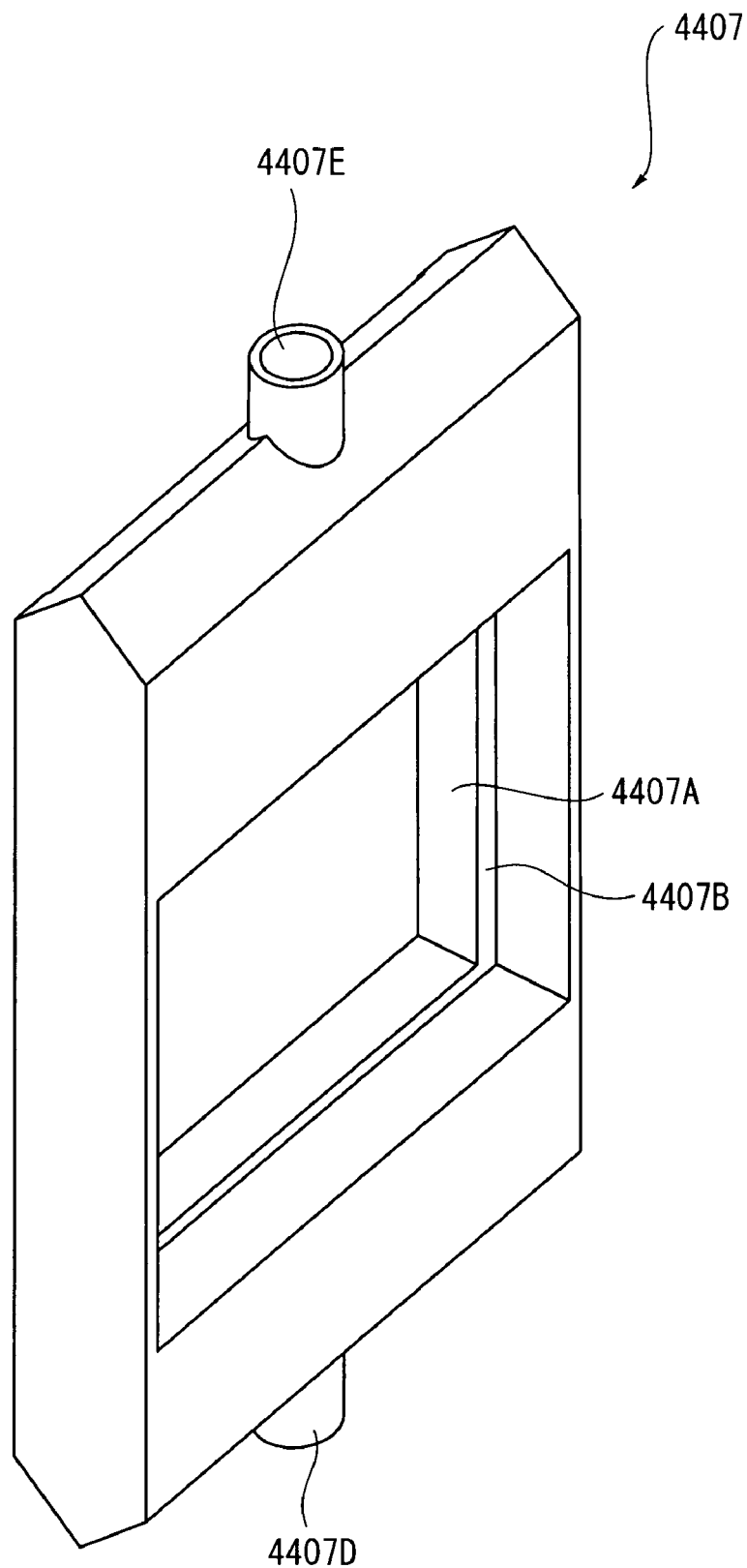
FIG. 7 is a perspective view of an optical modulator cooling unit in the above-mentioned exemplary embodiment, viewed from the light-irradiation side.

FIG. 7 is a perspective view of an optical modulator cooling unit 4407 from the light-irradiation side.

The optical modulator cooling unit 4407 is constituted by a hollow member made of aluminum which can internally enclose cooling fluid. This unit has an opening 4407A corresponding to the image formation area of the liquid crystal panel 441 and is formed in a ring-like shape, which appears to be substantially rectangular in a plan view and surrounds the outer circumference of the liquid crystal panel 441.

The opening 4407A is set to be slightly larger than the outer shape of the opposite board 441D of the liquid crystal panel 441, and has a shape the opposite board 441D and the dust-proof glass 441F attached thereto fit in the opening.

On the light-irradiation side of the optical modulator cooling unit 4407, the periphery of the opening 4407A is recessed forming a recess 4407B as shown in FIG. 7.

This recess 4407B has a slightly larger outer shape than that of the drive board 441C of the liquid crystal panel 441. When the opposite board 441D and the dust-proof glass 441F attached thereto are fit in the opening 4407A, the drive board 441C and the dust-proof glass 441F attached thereto are set in the recess 4407B.

That is, the inner surface of the opening 4407A and the recess 4407B correspond to ring-like inner side surfaces according to the present invention. In the optical modulator cooling unit 4407, the opening 4407A and the recess 4407B surround the outer circumference of the liquid crystal panel 441 when the liquid crystal panel 441 is installed.

In this case, the size between the bottom side and the light-incident side of the recess 4407B is set to be substantially equal to the whole thickness of the opposite board 441D and the dust-proof glass 441F attached thereon. The depth of the recess 4407B is set to be substantially equal to the whole thickness of the drive board 441C and the dust-proof glass 441F attached thereto. That is, where the liquid crystal panel 441 is set in the optical modulator cooling unit 4407, the light-incident side and the light-irradiation side become substantially flush.

Also in the optical modulator cooling unit 4407, a recess 4407C recessed toward the light-irradiation side is formed in the light-incident side from the upper end to the upper edge of the opening 4407A, as shown in FIG. 6. The width of the recess 4407C is set to be slightly larger than the width of the flexible printed board 441E of the liquid crystal panel 441.

Further, in the optical modulator cooling unit 4407, an inlet port 4407D for introducing the cooling fluid discharged from a cooling fluid outflow part 4401C of the fluid branch unit 4401 is formed at a substantial center part in a lower end part of the cooling unit 4407, as shown in FIG. 6 or 7. This inlet port 4407D is constituted by a substantially cylindrical member having a smaller pipe diameter than that of the fluid circulators 448, and protrudes toward the outside of the optical modulator cooling unit 4407. Further, the protruded end part of the inlet port 4407D is connected to the other end of the fluid circulator 448 connected to the cooling fluid outflow part 4401C of the fluid branch unit 4401. The cooling fluid discharged from the fluid branch unit 4401 flows into the optical modulator cooling unit 4407 through the fluid circulator 448.

Also in the optical modulator cooling unit 4407, an outlet port 4407E for discharging the cooling fluid from inside is formed at a substantial center part of the upper end of the unit 4407, as shown in FIG. 6 or 7. Like the inlet port 4407D, the outlet port 4407E is constituted by a substantially cylindrical member having a smaller pipe diameter than that of the fluid circulators 448, and is formed, protruded out of the optical modulator cooling unit 4407. Further, the protruded end part of the outlet port 4407E is connected to a fluid circulator 448. The cooling fluid introduced through the inlet port 4407D is discharged to the outside through the fluid circulator 448.

As shown in FIG. 6 or 7, the upper end part where the outlet port 4407E is formed is tapered such that the thickness of the optical modulator cooling unit 4407 decreases toward the upside. The shape of the inner side thereof is also tapered (see FIG. 9). The lower end part where the inlet port 4407D is formed is also tapered such that the thickness of the optical modulator cooling unit 4407 decreases toward the downside, as shown in FIG. 6 or 7. Thus, the upper and lower end parts are tapered, and therefore, it is possible to smoothly convect the cooling fluid flowing in and the cooling fluid flowing out.

Further, the liquid crystal panel 441 is assembled in the above-described optical modulator holder 4402, for example, in a manner described below.

Firstly, the liquid crystal panel 441 is assembled in the optical modulator cooling unit 4407.

More specifically, from the light-irradiation side of the optical modulator cooling unit 4407, the liquid crystal panel 441 is set in the opening 4407A and recess 4407B such that the flexible printed board 441E of the panel 441 is inserted in the opening 4407A of the optical modulator cooling unit 4407. In this state, the flexible printed board 441E is bent by the inner side surfaces of the opening 4407A and is placed along the bottom side of the recess 4407C formed in the light-incident side of the optical modulator cooling unit 4407 (see FIG. 9.)

Next, the plate-like member 4406 is attached to the optical modulator cooling unit 4407 in which the liquid crystal panel 441 has been assembled.

More specifically, the plate-like member 4406 is provided on the light-irradiation side of the optical modulator cooling unit 4407. The periphery of the opening 4406A of the plate-like member 4406 is connected heat-transferably to the dust-proof glass 441F provided on the light-irradiation side of the liquid crystal panel 441 and the light-irradiation side of the optical modulator cooling unit 4407. For example, the periphery of the opening 4406A of the plate-like member 4406 and the dust-proof glass 441F are fixed by a heat-conductive adhesion. Also, the periphery of the opening 4406A and light-irradiation side of the optical modulator cooling unit 4407 are fixed by a heat-conductive adhesion or by welding or the like.

Application of an adhesion or welding as described above may be effected entirely or locally on the periphery of the opening 4406A.

An integrated unit of the liquid crystal panel 441, optical modulator cooling unit 4407, and plate-like member 4406 are assembled in the optical modulator holding unit 4405.

More specifically, the integrating unit is inserted into the rectangular U-shape of the optical modulator holding unit 4405 from upside. The periphery of the opening 4405A1 of the rectangular plate-like member 4405A of the optical modulator holding unit 4405 is connected heat-transferably to the dust-proof glass 441F provided on the light-incident side of the liquid crystal panel 441 of the integrated unit and to the light-incident side of the optical modulator cooling unit 4407. For example, like in the foregoing assembling of the integrated unit, the periphery of the opening 4405A1 of the rectangular plate-like member 4405A and the dust-proof glass 441F are fixed by a heat-conductive adhesion. In addition, the periphery of the opening 4405A 1 is connected, by a heat-conductive adhesion or by welding, to the light-incident side of the optical modulator cooling unit 4407.

That is, the liquid crystal panel 441 and the optical modulator cooling unit 4407 are clamped by the optical modulator holding unit 4405 and the plate-like member 4406.

Further, the folded parts 4406B of the plate-like member 4406 is connected heat-transferably to the inner side surfaces of the pair of upright parts 4405B of the optical modulator holding unit 4405. This connection may employ, for example, a heat-conductive adhesion or welding or the like, like the foregoing case.

[Structure of Fluid Feed-in Unit]

As shown in FIG. 5 or 6, the fluid feed-in unit 4404 is constituted by an aluminum-made hollow member having substantially the same shape in plan view as the upper or lower surface of the cross dichroic prism 444. The unit 4404 is fixed to the upper side of the cross dichroic prism 444, which is an end surface crossing the three light-incident sides. This fluid feed-in unit 4404 collectively introduces all the cooling fluid discharged from respective optical modulator cooling units 4407, and discharges the introduced cooling fluid to the outside.

Three cooling fluid inflow parts 4404A for introducing the cooling fluid discharged from the respective optical modulator cooling unit 4407 are formed on the upper side of the fluid feed-in unit 4404, as shown in FIG. 5 or 6. These cooling fluid inflow parts 4404A each are constituted by a substantially cylindrical member having a smaller pipe diameter than that of the fluid circulators 448, and protrude toward inside and outside of the fluid feed-in unit 4404 (see FIG. 9). Further, the other ends of the fluid circulators 448 connected to the outlet ports 4407E of the three optical modulator cooling units 4407 at the outwardly protruding ends of the cooling fluid inflow parts 4404A. All the cooling fluid discharged from the respective optical modulator cooling units 4407 collectively introduced into the fluid feed-in unit 4404 through the fluid circulators 448.

Of the fluid feed-in unit 4404, a cooling fluid outflow part 4404B for discharging the introduced cooling fluid to the outside is formed on the end surface which corresponds to the light-irradiation side of the cross dichroic prism 444, as shown in FIG. 5. Like the cooling fluid inflow parts 4404A, the cooling fluid outflow part 4404B is constituted by a substantially cylindrical member having a smaller pipe diameter than that of the pipe diameter of the fluid circulators 448. This cooling fluid outflow part 4404B protrudes toward inside and outside of the fluid feed-in unit 4404 (see FIG. 9). Further, an outwardly protruding end of the cooling fluid outflow part 4404B is connected to an end of a fluid circulator 448, so that the cooling fluid inside the fluid feed-in unit 4404 is discharged the outside through the fluid circulator 448.

[Structure of Radiator]

Figure 8A:
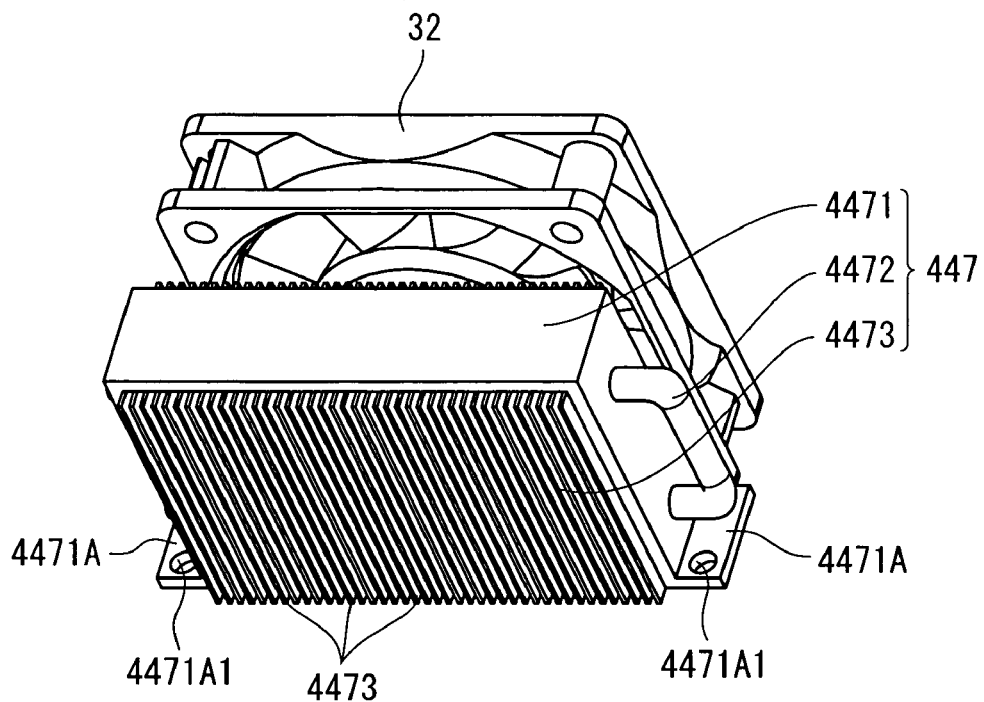
FIG. 8A is a perspective view showing the structure of a radiator in the exemplary embodiment, and a disposition between the radiator and an axial flow fan.
Figure 8B:
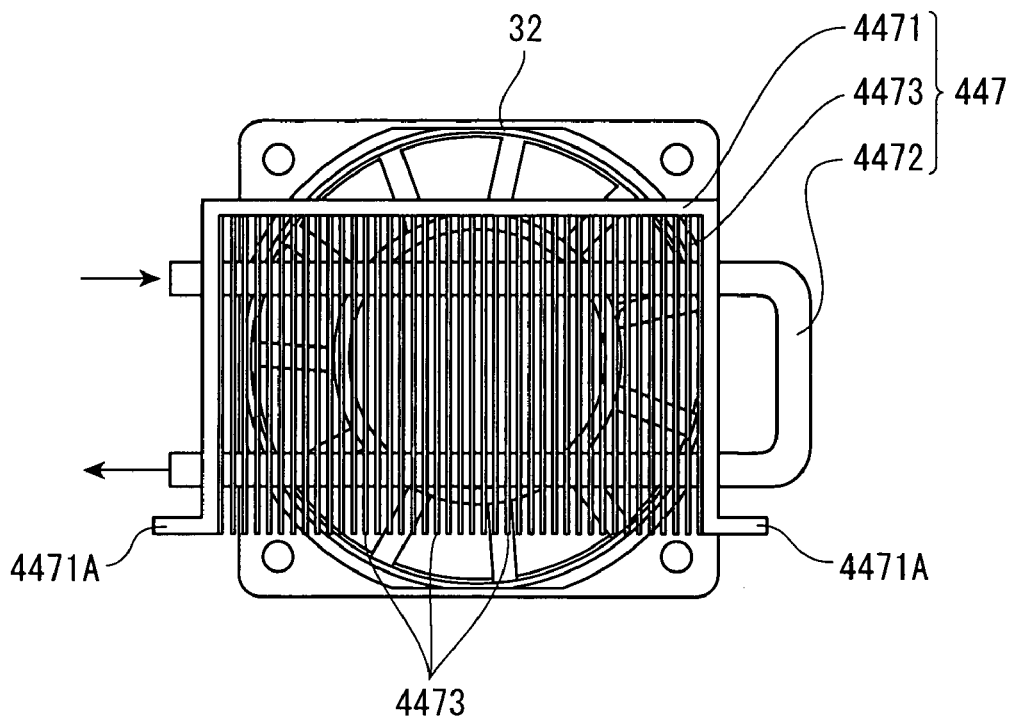
FIG. 8B is a plan view of the radiator and axial flow fan, viewed from the radiator side.

FIGS. 8A and 8B are views showing the structure of the radiator 447, and the disposition of the radiator 447 and the axial flow fan 32. Specifically, FIG. 8A is a perspective view in which the radiator 447 and the axial flow fan 32 are viewed from upside. FIG. 8B is a plan view of the radiator 447 and the axial flow fan 32 viewed from the side of the radiator 447.

As shown in FIG. 1 or 2, the radiator 447 is provided inside the partition 21 formed in the exterior casing 2, and releases heat of the cooling fluid which is heated by the liquid crystal panels 441 and the irradiation-side polarization plates 443 in the optical device body 440. This radiator 447 has a fixing part 4471, a cylindrical member 4472, and plural fins 4473, as shown in FIGS. 8A and B.

The fixing part 4471 is made of, for example, a heat-conductive member, such as metal. As shown in FIG. 8B, the fixing part 4471 has a substantially rectangular U-shape in plan view, and the cylindrical member 4472 is structured such that the cylindrical member 4472 is inserted insides of the rectangular U-shape which are opposed to each other. The fixing part 4471 also supports the plural heat release fins 4473 on the side surfaces of the rectangular U-shape. Extensions 4471A are formed at tip ends of the rectangular U-shape of the fixing part 4471. Through holes 4471A1 of the extensions 4471A, screws not shown are screwed into the exterior casing 2, thereby fixing the radiator 447 to the exterior casing 2.

The cylindrical member 4472 is made of aluminum. As shown in FIG. 8B, the cylindrical member 4472 has a substantially rectangular U-shape in a plan view. That is, the cylindrical member 4472 firstly extends from one edge of the rectangular U-shape of the fixing part 4471 toward the other edge of the rectangular U-shape. Secondly at an end in the extending direction, the member is bent substantially at 90°, and further extends downward. At an end in the downward extending direction, the member is further bent substantially at 90°, extends toward the one edge of the rectangular U-shape from the other edge of the rectangular U-shape, and heat-transferably connects to the fixing part 4471 and heat release fins 4473. In addition, this cylindrical member 4472 has a smaller pipe diameter than that of the fluid circulators 448. The upper side of the cylindrical member 4472 as shown in FIG. 8B is connected to the other end of the fluid circulator 448 which is connected to the cooling fluid outflow part 4404B of the fluid feed-in unit 4404 in the optical device body 440. On the other side, the other lower end shown in FIG. 8B is connected to the other end of the fluid circulator 448 which is connected to the cooling fluid inflow part 445A of the main tank 445.

Therefore, the cooling fluid discharged from the fluid feed-in unit 4404 passes the cylindrical member 4472 through the fluid circulator 448. The cooling fluid having passed through the cylindrical member 4472 is introduced into the main tank 445 through the fluid circulator 448.

The heat release fins 4473 are constituted by plates made of heat-conductive members of metal or the like, such that the cylindrical member 4472 can be inserted therein. The plural heat release fins 4473 are formed, each extended in a direction perpendicular to the insertion direction of the cylindrical member 4472, and are arranged in parallel to each other along the insertion direction of the cylindrical member 4472. In this layout state of plural heat release fins 4473, the cooling air sent from the axial flow fan 32 passes between the plural heat release fins 4473, as shown in FIGS. 8A and 8B.

As described above, the cooling fluid circulates through a flow path via the plural fluid circulators 448, from the main tank 445 to the fluid pressure-feed unit 446, the fluid branch unit 4401, the respective optical modulator cooling units 4407, the cooling fluid feed-in part 4404, the radiator 447, and back to the main tank 445.

[Cooling Structure]

Next, the cooling structure of the liquid crystal panels 441 and the irradiation-side polarization plates 443 will be described.

Figure 10:
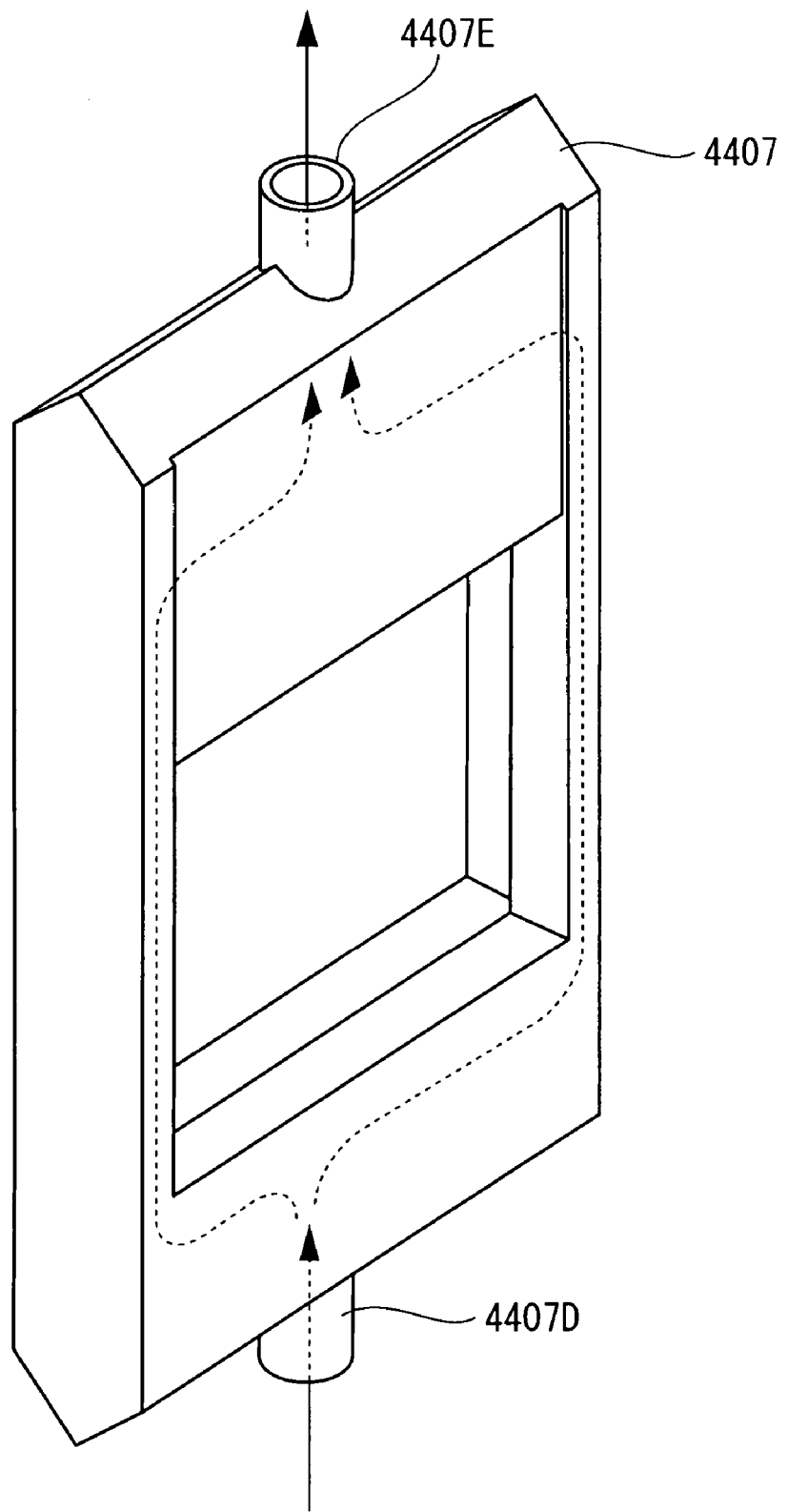
FIG. 10 is another view for explaining the cooling structure of the liquid crystal panel and the irradiation-side polarization plate in the above-mentioned exemplary embodiment.
Figure 11:
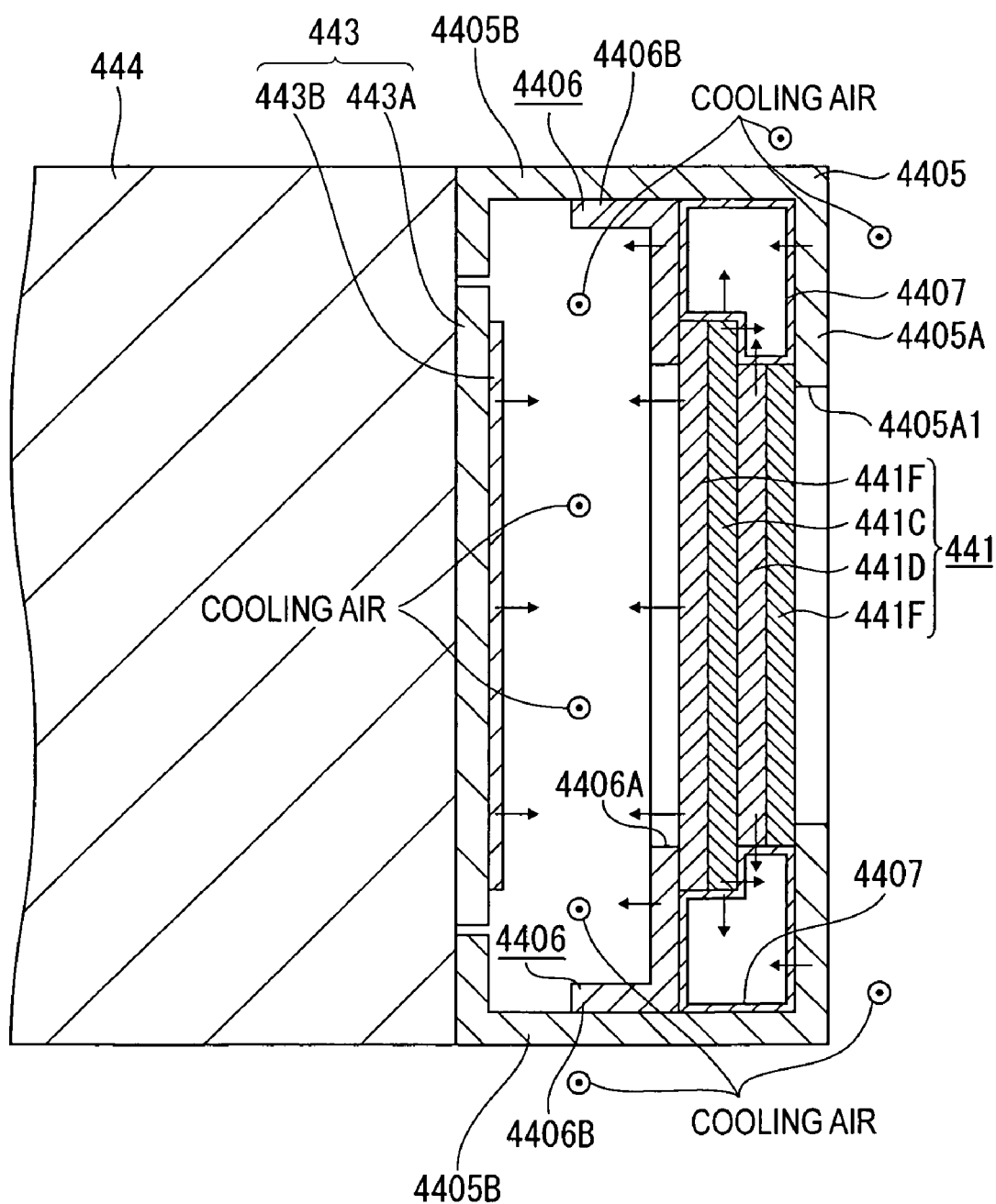
FIG. 11 is further another view for explaining the cooling structure of the liquid crystal panel and the irradiation-side polarization plate in the above-mentioned exemplary embodiment.

FIGS. 9 to 11 are views for explaining the cooling structure of the liquid crystal panels 441 and the irradiation-side polarization plates 443. Specifically, FIG. 9 is a lateral cross-sectional view of the optical device body 440. FIG. 10 is a view showing a state of the cooling fluid which convects inside the optical modulator cooling unit 4407. FIG. 11 is a view showing the flow of cooling air and is also a cross-sectional view of the optical device body 440 viewed from upside.

The liquid crystal panels 441 and the irradiation-side polarization plates 443 are cooled by heat transfer release by the cooling fluid, as described above, and by forcible cooling performed by the cooling unit 3 described previously. Therefore, the cooling of both types will be described in order.

First, conductive heat release from the liquid crystal panels 441 which is effected by the cooling fluid is carried out as described below.

As the fluid pressure-feed unit 446 drives, the cooling fluid in the main tank 445 is introduced into the fluid pressure-feed unit 446 through a fluid circulator 448 and is discharged to the fluid branch unit 4401 from the fluid pressure-feed unit 446.

As shown in FIG. 9, the cooling fluid introduced into the fluid branch unit 4401 is discharged from the fluid branch unit 4401 through the cooling fluid outflow parts 4401C, and is introduced into the optical modulator cooling units 4407 from the fluid circulators 448 through the inlet ports 4407D of the optical modulator cooling unit 4407.

The cooling fluid introduced into the optical modulator cooling units 4407 convects from downside to upside, along the lower ends of the liquid crystal panels 441 to the lateral sides and then to the upper ends thereof, as shown in FIG. 10.

Meanwhile, the heat generated at the liquid crystal panels 441 by the light beam irradiated from the light source device 411 is transferred, as shown in FIG. 9 or 11, from the outer circumferences of the liquid crystal panels 441 through the optical modulator cooling units 4407 to the cooling fluid in the optical modulator cooling units 4407. Moreover, as shown in FIG. 9, the heat is transferred to the optical modulator holding units 4405 and the plate-like members 4406 from the light-incident sides and light-irradiation sides of the liquid crystal panels 441. Part of heat transferred to the optical modulator holding units 4405 and the plate-like members 4406 is transferred to the cooling fluid inside the optical modulator cooling units 4407 from the peripheries of the openings 4405A1 of the rectangular plate members 4405A and the peripheries of the openings 4406A of the plate members 4406 through the optical modulator cooling units 4407.

As shown in FIG. 9 or 10, the heat transferred to the cooling fluid in the optical modulator cooling units 4407 moves upward in accordance with the flow of the cooling fluid, and further moves to the outside of the optical modulator cooling units 4407 through the outlet ports 4407E.

The heat transferred out of the optical modulator cooling units 4407 through the outlet ports 4407E transfers to the fluid feed-in unit 4404 through the fluid circulators 448, in accordance with the flow of the cooling fluid, and further transfers to the radiator 447. When the heated cooling fluid passes through the cylindrical member 4472 of the radiator 447, the heat of this cooling fluid is transferred to the plural heat release fins 4473 from the cylindrical member 4472. Further, the heat transferred to the plural heat release fins 4473 is cooled by the cooling air blown from the axial flow fan 32.

Further, the cooling fluid cooled by the radiator 447 moves from the radiator 447 to the main tank 445, the fluid pressure-feed unit 446, and the fluid branch unit 4401 and back to the optical modulator cooling units 4407.

Meanwhile, the conductive heat release by the irradiation-side polarization plates 443 is carried out as described below.

Heat generated at the polarization films 443B of the irradiation-side polarization plates 443 by the light beam emitted from the light source device 411 is transferred to the light-transmissive boards 443A, as shown in FIG. 9. The heat transferred to the light-transmissive boards 443A moves in upward and downward directions, as shown in FIG. 9, as the fluid feed-in unit 4404 and the fluid branch unit 4401 are connected in these directions. Further, the heat which has thus transferred upward and downward is transferred to the cooling fluid in each of the fluid feed-in unit 4404 and the fluid branch unit 4401 through the unit 4404 and unit 4401. As described previously, the heat is radiated by the radiator 447.

Next, the forced cooling of the liquid crystal panels 441 and the irradiation-side polarization plates 443 are performed by the cooling unit 3 in a manner described below.

The cooling air introduced in from outside the projector 1 is further introduced into the optical component housing 45 by the sirocco fan 31 of the cooling unit 3 through the holes 451C formed at the bottom side of the optical component housing 45.

With the optical device body 440 assembled, a substantially cylindrical space is defined by the end surfaces of the cross dichroic prism 444, the rectangular plate-like members 4405A, and the pair of upright parts 4405B in the optical modulator holding units 4405, as shown in FIG. 11.

Further, the cooling air introduced into the optical component housing 45 by the sirocco fan 31 flows upward from downside through the above-described space, as shown in FIG. 11.

At this time, the cooling air flowing through the above-described space cools, as shown in FIG. 11, the light-irradiation sides of the liquid crystal panels 441, and the light-incident sides of the polarization films 443B in the irradiation-side polarization plates 443. Also, part of the heat transferred to the plate-like members 4406 and the optical modulator holding units 4405 from the liquid crystal panel 441 is cooled by this cooling air, as shown in FIG. 11.

In the first exemplary embodiment described above, the optical modulator cooling units 4407 of the optical modulator holders 4402 are made of hollow members which can internally enclose cooling fluid, and respectively have ring-like shapes surrounding the outer circumferences of the liquid crystal panels 441. Therefore, light beam does not transmit the cooling fluid in the optical modulator cooling units 4407. As a result, for example, even if air bubbles, dust, and the like are mixed in the cooling fluid, those mixed air bubbles, dust, and the like are not irradiated with light beam. Accordingly, images of those air bubbles and dust are not reflected on optical images formed by the liquid crystal panels 441. Alternatively, even if a temperature difference appears in the cooling fluid and causes variance in the refraction index or the like of the cooling fluid for example, optical images formed by the liquid crystal panels 441 do not shimmer. Furthermore, for example, even if cooling fluid deteriorates and is colored, neither illumination intensity fall nor degradation of color reproducibility are incurred in optical images formed by the liquid crystal panels 441. Accordingly, the optical images formed by the liquid crystal panels 441 can be stably maintained. In addition, the structure is arranged such that cooling fluid is not filled in the light-incident side and/or light-irradiation side of the liquid crystal panels 441. Therefore, packing or the like for enclosing cooling fluid can be omitted, so that an excellent liquid-cooling system can be realized without leakages of cooling fluid.

Moreover, the optical modulator cooling units 4407 are made of aluminum which has excellent heat conductivity, and are connected heat-transferably to the liquid crystal panels 441 by the openings 4407A and recesses 4407C. Therefore, the heat generated at the liquid crystal panels 441 can be released from the outer circumferences of the liquid crystal panels 441 to the cooling fluid inside, via the optical modulator cooling units 4407. Furthermore, inlet ports 4407D and outlet ports 4407E are formed in the optical modulator cooling units 4407. Therefore, cooling fluid can be easily convects through the fluid circulators 448. It is hence possible to avoid that the cooling fluid heated by the liquid crystal panels 441 stays in the optical modulator cooling units 4407. Therefore, the cooling fluid is prevented from being heated and from reducing thereby the temperature difference between the liquid crystal panels 441 and the cooling fluid. Accordingly, the liquid crystal panels 441 can be cooled efficiently.

Further, the optical modulator holding units 4405 and the plate-like members 4406 of the optical modulator holders 4402 are made of iron-nickel alloy which has excellent thermal conductivity. The periphery of each of the openings 4405A1 and 4406A heat-transferably contacts corresponding one of the liquid crystal panels 441, thereby clamping the liquid crystal panels 441. Therefore, the heat generated at the liquid crystal panels 441 can be released to the optical modulator holding units 4405 and the plate-like members 4406, in addition to the optical modulator cooling units 4407, so that the cooling efficiency of the liquid crystal panels 441 improves. Moreover, the optical modulator holders 4402 and the plate-like members 4406 are connected heat-transferably to the dust-proof glass 441F of the liquid crystal panels 441 made of sapphire or crystal which has excellent thermal conductivity. Therefore, the heat generated at the liquid crystal panels 441 can be excellently transferred to the optical modulator holding units 4405 and the plate-like members 4406 through the pair of dust-proof glass 441F, so that the cooling efficiency of the liquid crystal panels 441 improves much more.

Since the optical modulator holding units 4405 and the plate-like members 4406 are made of iron-nickel alloy, the thermal expansion coefficients of the optical modulator holding units 4405 and the plate-like members 4406 can be set close to the thermal expansion coefficient of the dust-proof glass 441F, as shown in tables 1 and 2. As a result, the amount of dimensional changes (expansion and contraction) caused by heat of respective members can be substantially equalized between each pair of dust-proof glass 441F and corresponding one optical modulator holding unit 4405 and plate-like members 4406. Therefore, the heat generated at the liquid crystal panels 441 can be excellently transferred to the optical modulator holding units 4405 and the plate-like members 4406. Simultaneously, each liquid crystal panel 441 is prevented from being deformed by such dimensional changes due to heat of corresponding optical modulator holding unit 4405 and plate-like members 4406 and the pair of dust-proof glass 441F. It is thus possible to avoid deterioration of image quality caused by changes in shape of liquid crystal enclosed in the liquid crystal panels 441.

Furthermore, the optical modulator holding units 4405 each have a substantially rectangular U-shaped cross-section, a liquid crystal panel 441 is clamped between a rectangular plate-like member 4405A and plate-like members 4406, inside the rectangular U-shape. The open part of the rectangular U-shape is closed by the fluid branch unit 4401, cross dichroic prism 444, and the fluid feed-in unit 4404, so that a cylindrical space is created inside the rectangular U-shape. Since cooling air is let flow through this space by the sirocco fan 31 of the cooling unit 3, the cooling air does not leak out of this space. The liquid crystal panels 441 in the space, the irradiation-side polarization plates 443, the inner side surfaces of the rectangular U-shapes of the optical modulator holding units 4405, the plate-like members 4406, and the optical modulator cooling units 4407 can be forcibly cooled. In addition, forced cooling can be performed from the outer side surfaces of the optical modulator holding units 4405. In addition to the cooling by the cooling fluid as described above and the conductive heat release to the optical modulator holding units 4405 and plate-like members 4406 as also described above, the liquid crystal panels 441 can be cooled much more efficiently.

Since the optical modulator cooling units 4407 are connected heat-transferably to the peripheries of the openings 4405A1 and 4406A of the optical modulator holding unit 4405 and the plate-like members 4406 by welding, an adhesion, or the like. Therefore, it is possible to securely maintain a heat-transfer path through which the heat transferred to the optical modulator holding units 4405 and the plate-like members 4406 from the liquid crystal panels 441 is transferred to the cooling fluid inside, through the optical modulator cooling units 4407. Accordingly, the cooling efficiency of the liquid crystal panels 441 can be improved much more.

In addition, the optical modulator cooling units 4407 can be fixed to the optical modulator holding units 4405 and plate-like members 4406. Hence, the optical modulator holders 4402 each are unified, so that the liquid crystal panels 441 can be held stably.

Further, a pair of folded parts 4406B of each plate-like member 4406 are connected heat-transferably to the end surfaces opposed to each other of a pair of upright parts 4405B of a corresponding optical modulator holding unit 4405, by welding, adhesion, or the like. Therefore, a heat-transfer path through which the heat transferred from a liquid crystal panel 441 to a plate-like member 4406 is transferred to the pair of upright parts 4405B of the optical modulator holding unit 4405 can be securely maintained, so that the cooling efficiency of the liquid crystal panels 441 can be improved much more.

Moreover, a liquid crystal panel 441 can be held further stably by fixing each plate-like member 4406 to the pair of upright parts 4405B of an optical modulator holding unit 4405.

The fluid branch unit 4401 of the optical device 44 feeds out cooling fluid inside, branching the cooling fluid for each of the optical modulator cooling units 4407. Therefore, the temperature of the cooling fluid introduced into each of the optical modulator cooling units 4407 is not biased but the liquid crystal panels 441R, 441G, and 441B can be cooled by cooling fluid having a substantially uniform temperature.

In addition, the capacity of cooling fluid can be enhanced by enclosing cooling fluid not only in the inside of each optical modulator cooling unit 4407 but also in the plural fluid circulators 448, fluid branch unit 4401, fluid feed-in unit 4404, main tank 445, fluid pressure-feed unit 446, and cylindrical member 4472 of the radiator 447. Accordingly, the capability of heat-exchange between the liquid crystal panels 441 and cooling fluid can be improved.

Further, the fluid branch unit 4401 and the fluid feed-in unit 4404 are attached respectively to the upper and lower surfaces of cross dichroic prism 444. Therefore, even if the optical device 44 is constituted by three liquid crystal panels 441, the device 44 can be compact. Thus, downsizing of the optical device 44 is promoted.

Further, even when each optical modulator cooling unit 4407 is connected to other members than the main tank 445, the fluid pressure-feed unit 446, and the radiator 447, such members need only to be connected with the fluid branch unit 4401 and the fluid feed-in unit 4404 by fluid circulators 448. It is unnecessary to connect every optical modulator cooling unit 4407 directly to the other member by fluid circulators 448. Therefore, the fluid circulators 448 can be installed with ease.

The fluid branch unit 4401 and the fluid feed-in unit 4404 are made of aluminum which has excellent thermal conductivity, and the pair of upright parts 4405B of the optical modulator holding units 4405 are attached heat-transferably to the fluid branch unit 4401 and the fluid feed-in unit 4404. Therefore, a heat-transfer path through which the heat transferred from the liquid crystal panels 441 to the optical modulator holding units 4405 is transferred to the fluid branch unit 4401 and the fluid feed-in unit and further to the cooling fluid inside the fluid branch unit 4401 and the fluid feed-in unit 4404 can be securely maintained, so that the cooling efficiency of the liquid crystal panels 441 can be improved much more.

Three irradiation-side polarization plates 443 are attached heat-transferably to three end surfaces of each of the fluid branch unit 4401 and the fluid feed-in unit 4404, such that at least the light-transmissive boards 443A made of sapphire, crystal or the like having excellent heat conductivity of 9 W/m·K or more cross the end surfaces of the fluid branch unit 4401 and the end surfaces of the fluid feed-in unit 4404. Therefore, the heat generated at the polarization films 443B by light beam irradiated from the light source device 411 can be transferred to the fluid branch unit 4401 and the fluid feed-in unit 4404 through the light-transmissive boards 443A and further to the cooling fluid inside the fluid branch unit 4401 and the fluid feed-in unit 4404. Accordingly, not only the liquid crystal panels 441 but also the irradiation-side polarization plates 443 can have improved cooling efficiency.

Further, since the optical device 44 has the fluid pressure-feed unit 446, the cooling fluid in the optical modulator cooling units 4407 which has been heated by the liquid crystal panels 441 is discharged to the outside through plural fluid circulators 448. Cooling fluid outside is introduced into the optical modulator cooling unit 4407 through plural fluid circulators 448, as well. Thus, the cooling fluid inside the optical modulator cooling unit 4407 can be changed steadily. Therefore, a great temperature difference is securely maintained between the liquid crystal panels 441 and the cooling fluid, so that the heat-exchange efficiency between the cooling fluid and the liquid crystal panels 441 can be improved much more.

Further, the opening 4407A and the recess 4407C of each optical modulator cooling unit 4407 have shapes which correspond to the outer shape of the liquid crystal panel 441, and are formed to allow the liquid crystal panel 441 to fit in. Therefore, the liquid crystal panels 441 can be easily installed in the optical modulator cooling units 4407. That is, work for assembling the liquid crystal panels 441 into the optical modulator holders 4402 can be carried out easily. In addition, since the structure is arranged such that the liquid crystal panels 441 are thus fit in the optical modulator cooling units 4407, no excess stress is applied to the liquid crystal panels 441 while the liquid crystal panels 441 is held securely. Accordingly, the liquid crystal panels 441 are not deformed, avoiding deterioration of image quality which may otherwise be caused by changes in shape of liquid crystal enclosed in the liquid crystal panels 441.

In a state where the liquid crystal panels 441 are set in the optical modulator cooling units 4407, the flexible printed boards 441E are bent toward the light-incident side by the inner side surfaces of the openings 4407A. At the same time, the flexible printed boards 441E are arranged along the bottom sides of the recess 4407C formed on the light-incident sides of the optical modulator cooling units 4407. Therefore, the flexible printed boards 441E do not interfere with the fluid circulators 448 connected to the outlet ports 4407E of the optical modulator cooling units 4407. Accordingly, assembly work for the optical device 44 can be carried out easily.

Since the projector 1 has thus the optical device 44 which can efficiently cool the liquid crystal panels 441, it is possible to prevent deterioration of the liquid crystal panels 441 from being caused by heat, and to extend the lifetime of the projector 1.

Also, the projector 1 has the optical device 44 which stably maintain optical images formed by the liquid crystal panels 441. Therefore, excellent optical images can be projected through the projection lens 5.

[Second Embodiment]

Next, the second exemplary embodiment of the present invention will be described with reference to the attached drawings.

In the following description, the same structures and members as those in the first exemplary embodiment will be denoted at the same reference symbols, and detailed descriptions thereof will be omitted or simplified.

In the above first exemplary embodiment, absorptive polarization plates are employed as the irradiation-side polarization plates 443 of the optical device body 440. The absorptive polarization plate transmits the light beam having a predetermined polarization axis out of the incident light beams, and absorbs the other light beams having a different polarization axis.

In contrast, the second exemplary embodiment differs only in the point that irradiation-side polarization plates 543 are constituted by reflective polarizer transmitting the light beam having a predetermined polarization axis out of the incident light beams, and reflects other light beam having a different polarization axis. The other points of the structure are the same as those of the first exemplary embodiment of an above-described.

Figure 12:
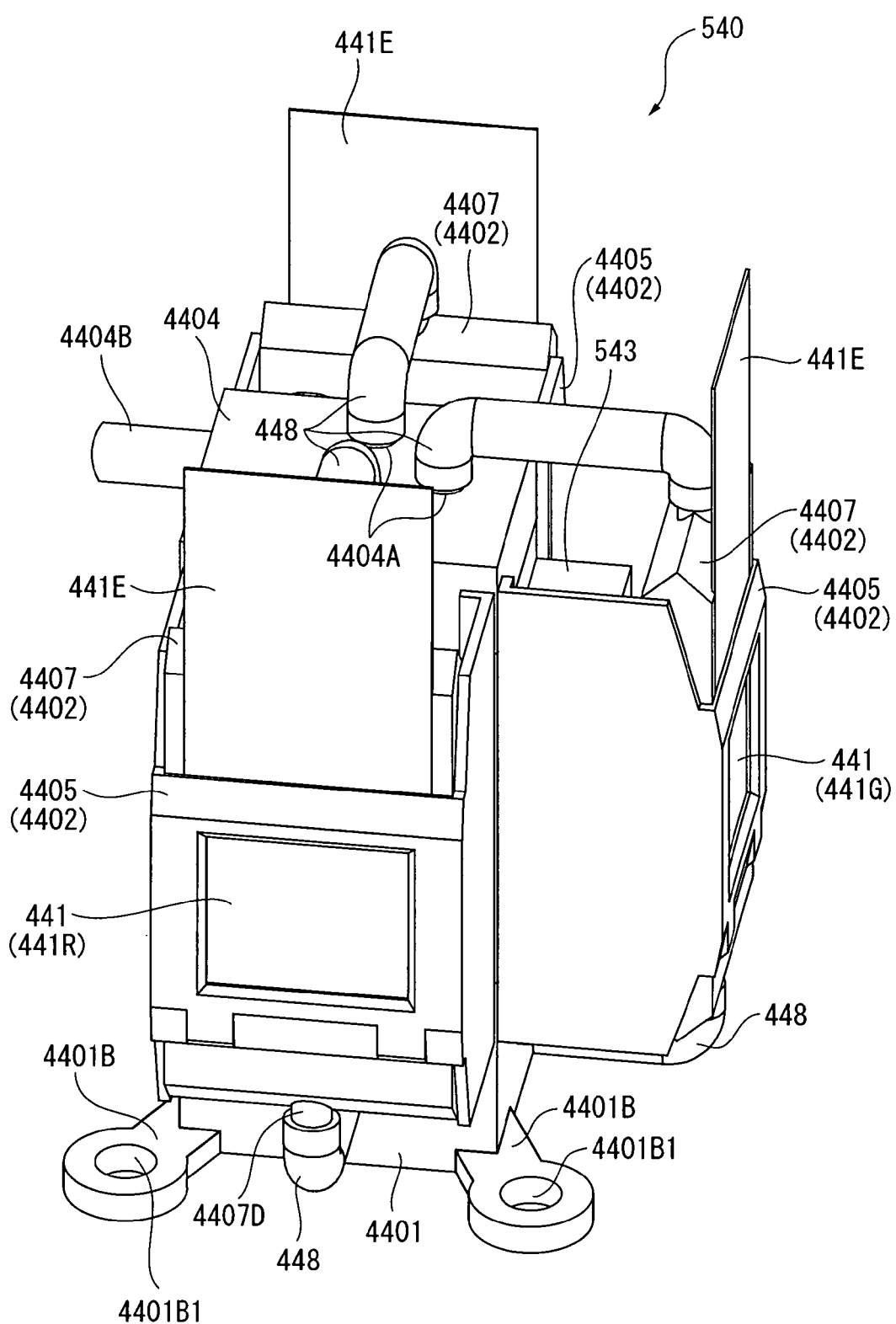
FIG. 12 is a perspective view showing a schematic structure of an optical device body in a second exemplary embodiment.

Specifically, FIG. 12 is a perspective view showing the schematic structure of an optical device body 540 in the second exemplary embodiment.

Figure 13:
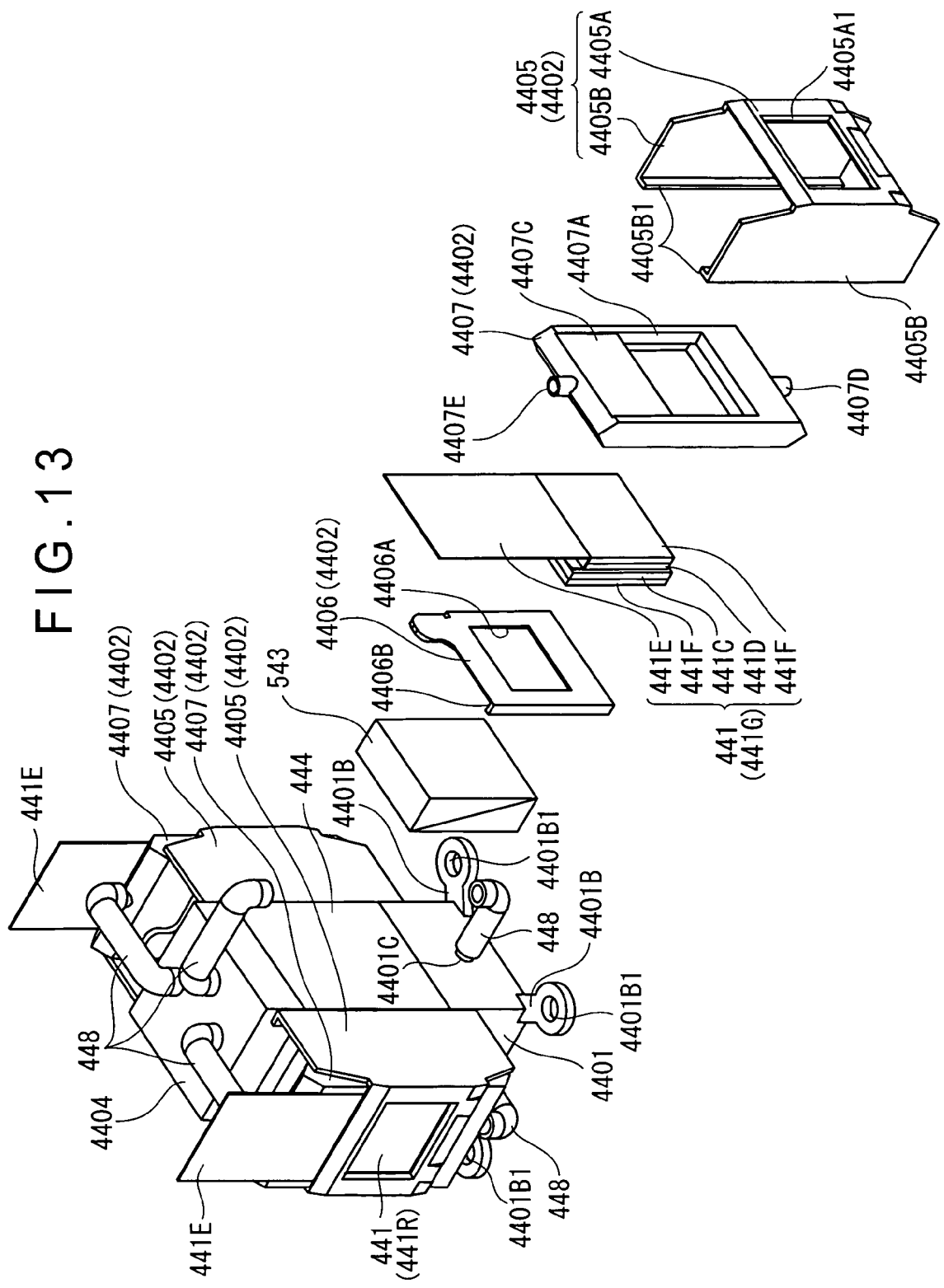
FIG. 13 is an exploded perspective view showing the schematic structure of the optical device body in the exemplary embodiment.

FIG. 13 is an exploded perspective view showing the schematic structure of the optical device body 540 in the second exemplary embodiment. Although only the part in the G color side is exploded in FIG. 13, the other parts in the R and B color sides are also constructed in the same structure.

The irradiation-side polarization plates 543 each have a substantially rectangular shape having predetermined thickness, as shown in FIG. 12 or 13. Light-irradiation sides thereof are attached and fixed respectively to the light-incident sides of the cross dichroic prism 444.

Since the three irradiation-side polarization plates 543 each have predetermined thickness, the optical modulator holding units 4405 of the optical modulator holders 4402 forming part of the optical device body 540 have such pair of upright parts 4405B that are longer in the optical axis directions, compared with the first exemplary embodiment described above.

Figure 14:
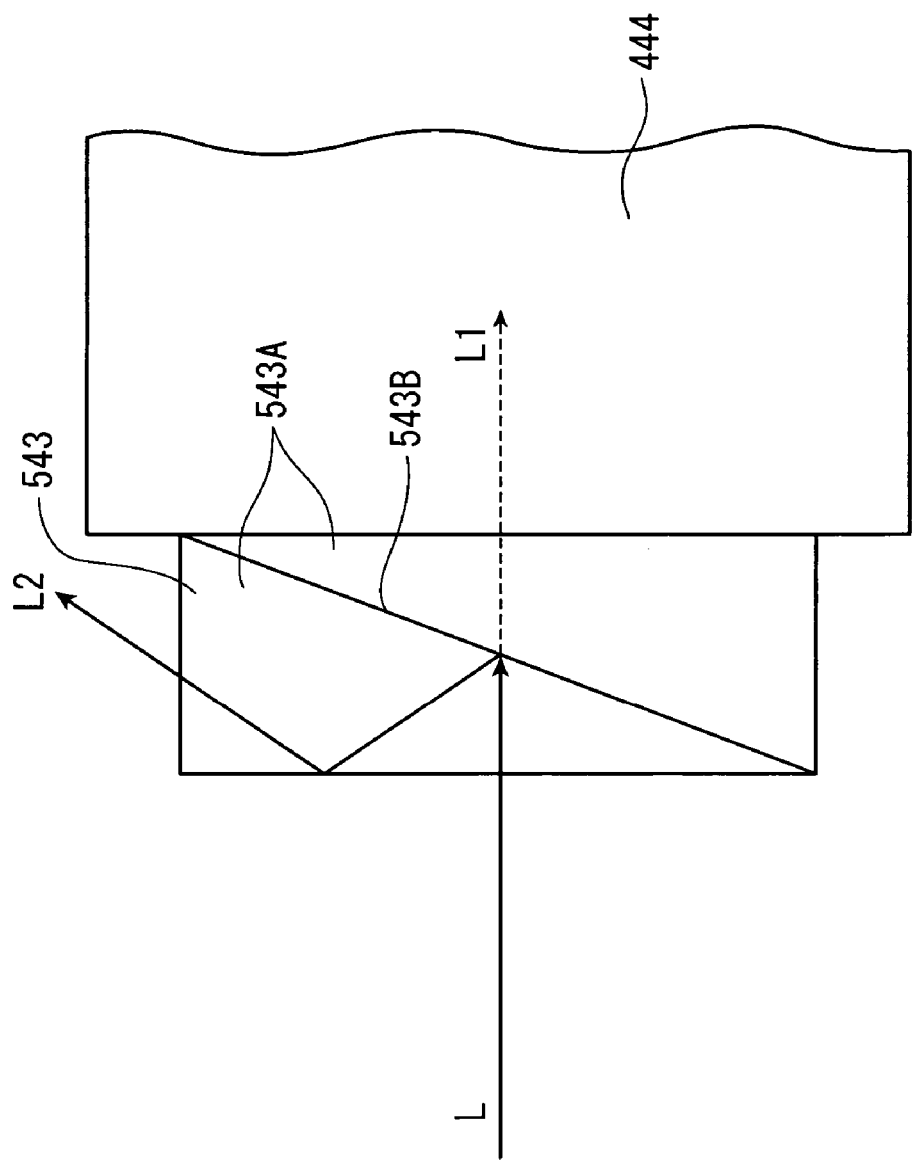
FIG. 14 is a view showing schematically the structure of an irradiation-side polarization plate in the exemplary embodiment.

FIG. 14 is a view schematically showing the structure of the irradiation-side polarization plates 543. Specifically, FIG. 14 is view of the irradiation-side polarization plates 543 observed laterally.

The irradiation-side polarization plates 543 each have two right-angle prisms 543A and a reflective polarization film 543B formed at the interface between the right-angle prisms 543A, as shown in FIG. 14. Of these components, the reflective polarization film 543B may employ, for example, a multilayer-structure film in which a lot of films formed by drawing polymer are layered.

Further, as shown in FIG. 14, light beam L1 having a predetermined polarization axis of light beam L which is incident on an irradiation-side polarization plate 543 transmits the reflective polarization film 543B, and are incident on the cross dichroic prism 444.

Also as shown in FIG. 14, of the light beam L which has been incident on the irradiation-side polarization plates 543, light-flux L2 having a different polarization axis is reflected by the reflective polarization film 543B and is then totally reflected by the light-incident side of the right-angle prism 543A. Thus, the light beam L2 is irradiated upward.

Figure 15:
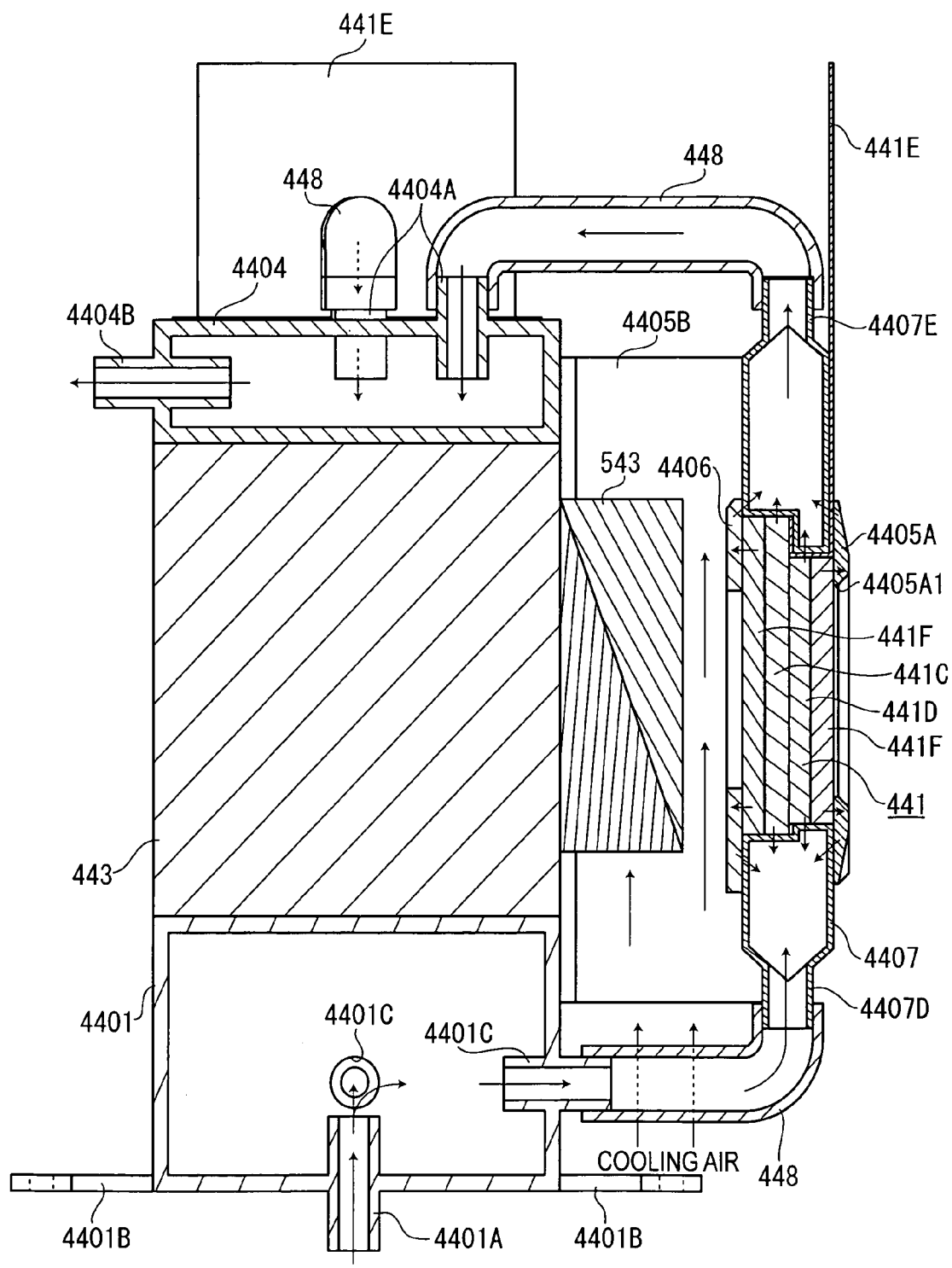
FIG. 15 is a cross-sectional view for explaining the cooling structure of a liquid crystal panel and an irradiation-side polarization plate in the exemplary embodiment.

FIG. 15 is a cross-sectional view for explaining the cooling structure of liquid crystal panels 441 and irradiation-side polarization plates 543.

Since the irradiation-side polarization plates 543 can reduce the heat generated by the light beam irradiated from the light source device 411, according to the structure described above, the conductive heat release by the cooling fluid described in the first exemplary embodiment is not carried out, namely, as shown in FIG. 15, no thermally transferable connection to the end surfaces of the fluid branch unit 4401 and the fluid feed-in unit 4404 is provided.

The conductive heat release by the cooling fluid of the liquid crystal panels 441, and the forced cooling by the liquid crystal panels 441 and cooling unit 3 on the irradiation-side polarization plates 443 can be carried out like the first exemplary embodiment described above, as shown in FIG. 15. Therefore, a detailed description thereof will be omitted herefrom.

In the second exemplary embodiment described, the irradiation-side polarization plates 543 are constituted by reflective polarizer, and therefore each reflect such light beam having a different polarization axis from a predetermined polarization axis. As a result, the irradiation-side polarization plates 543 generate less heat than in the above-mentioned first exemplary embodiment, so that the temperature of the irradiation-side polarization plates 543 themselves can be reduced. Accordingly, as described in the foregoing first exemplary embodiment, it is unnecessary to provide the structure in which the irradiation-side polarization plates 443 are heat-transferably to the fluid branch unit 4401 and the fluid feed-in unit 4404. It is possible to employ another structure instead, in which the irradiation-side polarization plates 543 are attached directly to the light-incident sides of the cross dichroic prism 444 can be adopted.

In addition, since the temperature of the irradiation-side polarization plates 543 themselves can be reduced, the temperature inside the optical modulator holders 4402 can be lowered. As a result, the liquid crystal panels 441 can be cooled efficiently.

Furthermore, the irradiation-side polarization plates 543 reflect light beam having different polarization axes from the predetermined ones in safe directions avoiding the image formation areas of the liquid crystal panels 441. Therefore, optical images formed by the liquid crystal panels 441 can be maintained stably without causing stray light in the optical device body 440. Excellent optical images can be formed accordingly.

Furthermore, the irradiation-side polarization plates 543 each have two right-angle prisms 543A and a reflective polarization film 543B. Of the two right-angle prisms 543A, the prism 543A provided on the light-incident side totally reflects the light beam reflected by the reflective polarization film 543B, by its light-incident side, and irradiates the light beam upward. Thus, with a simple structure, it is possible to avoid stray light appearing in the optical device body 440.

In the above, the present invention has been described with reference to preferred exemplary embodiments. This invention is not limited to these exemplary embodiments but various modifications and design changes are possible without deviating from the scope of the present invention.

In the exemplary embodiments described above, the positions where the inlet ports 4407D and outlet ports 4407E of the optical modulator cooling units 4407 are formed are not limited to those described in the above exemplary embodiments but may be set at different positions. For example, the flow direction of cooling fluid is reversed. That is, it is possible to adopt a structure in which the inlet ports 4407D and the outlet ports 4407E serve as outlet ports and inlet ports, respectively.

Also in the above exemplary embodiments, the optical device 44 has been described as having a structure which includes the main tank 445, fluid pressure-feed unit 446, and radiator 447. However, the structure is not limited hitherto. Even a structure which lacks any of the main tank 445, fluid pressure-feed unit 446, and radiator 447 can sufficiently achieve the object of the present invention.

In each of the above exemplary embodiments, the incident-side polarization plates 442 have been described as absorptive polarizer. However, the incident-side polarization plates 442 may be reflective polarizer transmitting light beam having a predetermined polarization axis and reflects other light beams having a different polarization axis. For example, these plates 442 may have substantially the same structure as the irradiation-side polarization plates 543 as described in the second exemplary embodiment.

Also in each of the above exemplary embodiments, the irradiation-side polarization plates 443 functions as optical converter. However, the optical converter may be retardation plates, field-angle correction plates, or the like.

Also in each of the above exemplary embodiments, the fluid circulators 448, main tank 445, fluid pressure-feed unit 446, cylindrical members 4472 of the radiator 447, optical modulator cooling units 4407, fluid branch unit 4401, and fluid feed-in unit 4404 are members which contact cooling fluid and are hence constituted by aluminum-made members. However, the material of these members is not limited to aluminum. As long as the material has corrosion-resistance, these members may be made of any other material, e.g., oxygen-free copper, duralumin, or the like. In addition, the fluid circulators 448 may be formed of butyl-rubber, fluorine rubber, or the like having a low hardness degree which applies small deformation-reactive force to the optical modulator cooling units 4407 and therefore suppresses displacement of pixels.

Also in each of the exemplary embodiments described above, the flow rates of the cooling fluid introduced into the respective optical modulator cooling units 4407 are set to be uniform, but the flow rates of cooling fluid flowing into the individual optical modulator cooling units 4407 may differ from each other.

For example, it is possible to provide such a structure in which valves are provided in the course of flow paths from the fluid branch unit 4401 to the optical modulator cooling units 4407. By changing the positions of the valves, the flow paths are narrowed or widened.

Further, for example, it is possible to adopt a structure in which fluid circulators 448 connecting the fluid branch unit 4401 to the optical modulator cooling units 4407 have different pipe diameters respectively corresponding to the liquid crystal panels 441R, 441G, and 441B.

In each of the exemplary embodiments described above, although the optical modulator holders 4402 are connected heat-transferably to the fluid branch unit 4401 and fluid feed-in unit 4404, such that the holders cross over the unit 4401 and the unit 4404. The object of the present invention can be sufficiently achieved even with a structure in which the optical modulator holders 4402 are attached only to the cross dichroic prism 444.

Also in the first exemplary embodiment described above, the irradiation-side polarization plates 443 are connected heat-transferably to the fluid branch unit 4401 and the fluid feed-in unit 4404, crossing over these units 4401 and 4404. Even if a structure in which the plates 443 are attached only to the cross dichroic prism 444, cooling can be sufficiently performed by the sirocco fan 31 of the cooling unit 3.

In each of the exemplary embodiments described above, descriptions have been made of a structure in which the optical unit 4 is substantially L-shaped in plan view. The optical unit 4 may be substantially U-shaped in a plan view.

Each of the exemplary embodiments described above has cited only examples of the projector 1 using three liquid crystal panels 441. However, the present invention is also applicable even if the projector uses only one liquid crystal panel, two liquid crystal panels, or four or more liquid crystal panels.

Each of the exemplary embodiments described above uses transmissive liquid crystal panels each having a light-incident side and a light-irradiation side which are different from each other. Alternatively, it is possible to use a liquid crystal panel in which the light-incident side and the light-irradiation side are identical to each other.

In each of the above exemplary embodiments, liquid crystal panels are used as optical modulators. Alternatively, optical modulators other than those using liquid crystal may be employed, e.g., a device using a micro mirror. In this case, polarization plates on the light-incident side and the light-irradiation side can be omitted.

Each of the above exemplary embodiments has cited only examples of a projector of a front-projection type which projects images in a direction in which observers see the screen. The present invention is applicable also to a projector of a rear-projection type which projects images from the opposite side in an observing direction.

The above descriptions have disclosed best modes or structures in practicing the present invention. The present invention, however, is not limited to the descriptions made above. That is, although major specific exemplary embodiments of the present invention have been particularly depicted and described, skilled persons in the art would be able to variously modify the detailed structures of the present invention including shapes, materials, amounts, and the like, without deviating from the scope of the technical ideas and objects of the present invention.

Therefore, descriptions which define shapes, materials, and the like disclosed herein are only to help understanding of the present invention by examples, and do not specifically limit the scope of the present invention. The scope of the present invention would hence include even such descriptions that refer to names of components from which part or all of limitations concerning shapes, materials, or the like are removed.

The priority application Number JP2004-092361 upon which this patent application is based is hereby incorporated by reference.

What is claimed is:

1. An optical modulator holder which holds and cools an optical modulator for modulating light beam emitted from a light source in accordance with image information to form an optical image, the holder comprising:

an optical modulator holding unit including a rectangular plate-like member having an opening corresponding to an image formation area of the optical modulator, and a pair of upright parts being upright in an out-of-plane direction of the rectangular plate-like member respectively from opposed edges of the rectangular plate-like member, the optical modulator holding unit having a substantially rectangular U-shape cross section and being made of heat-conductive material;

a plate-like member having an opening corresponding to the image formation area of the optical modulator, and made of heat-conductive material; and an optical modulator cooling unit constituted by a hollow member which is made of heat-conductive material and capable of enclosing cooling fluid inside, wherein in the rectangular plate-like member of the optical modulator holding unit and the plate-like member, peripheries of the respective openings heat-transferably contact respectively with each of a light-incident side and a light-irradiation side of the optical modulator, threreby holding the optical modulator inside the rectangular U-shape of the optical modulator holding unit, and the optical modulator cooling unit is formed in a ring-like shape arranged so as to surround outer circumference of the optical modulator and connected heat-transferably to the optical modulator on inner side surfaces, the optical modulator cooling unit having an inlet port for introducing the cooling fluid to inside and an outlet port for discharging the cooling fluid from inside to outside.

2. The optical modulator holder according to claim 1, wherein the rectangular plate-like member and the plate-like member have a larger outer size than that of the optical modulator, and the optical modulator cooling unit is held by the rectangular plate-like member and the plate-like member and is heat-transferably connected to the peripheries of the respective openings of the rectangular plate-like member and the plate-like member with the optical modulator holder being assembled completely.

3. The optical modulator holder according to claim 1, wherein the plate-like member is constituted by a plate member having a rectangular shape in a plan view, and has a pair of folded parts folded in an out-of-plane direction from opposed edges of the plate member, and the pair of folded parts are connected heat-transferably to opposed end faces of the pair of upright parts of the optical modulator holding unit with the optical modulator holder being assembled completely.

4. The optical modulator holder according to claim 1, wherein the optical modulator holding unit and the plate-like member are made of iron-nickel alloy.

5. An optical device having an optical modulator which modulates light beam emitted from a light source in accordance with image information to form an optical image and an optical modulator holder holding and cooling the optical modulator, wherein the optical modulator holder includes:

an optical modulator holding unit including a rectangular plate-like member having an opening corresponding to an image formation area of the optical modulator, and a pair of upright parts being upright in an out-of-plane direction of the rectangular plate-like member respectively from opposed edges of the rectangular plate-like member, the optical modulator holding unit having a substantially rectangular U-shape cross section and being made of heat-conductive material;

a plate-like member having an opening corresponding to the image formation area of the optical modulator, and made of heat-conductive material; and an optical modulator cooling unit constituted by a hollow member which is made of heat-conductive material and capable of enclosing cooling fluid inside, wherein in the rectangular plate-like member of the optical modulator holding unit and the plate-like member, peripheries of the respective openings heat-transferably contact respectively with each of a light-incident side and a light-irradiation side of the optical modulator, threreby holding the optical modulator inside the rectangular U-shape of the optical modulator holding unit, and the optical modulator cooling unit is formed in a ring-like shape arranged so as to surround outer circumference of the optical modulator and connected heat-transferably to the optical modulator on inner side surfaces, the optical modulator cooling unit having an inlet port for introducing the cooling fluid to inside and an outlet port for discharging the cooling fluid from inside to outside, and wherein the optical device further comprises a plurality of fluid circulators which are connected so as to communicate with an inlet port and outlet port of an optical modulator cooling unit of the optical modulator holder, guide cooling fluid inside the optical modulator cooling unit to outside, and guide the cooling fluid again into the optical modulator cooling unit.

6. The optical device according to claim 5, comprising:
the optical modulator including a plurality of optical modulators;
the optical modulator holder including a plurality of optical modulator holders, corresponding to the plurality of optical modulators;
a color-combining optical device which has plurality of light-incident sides where the plurality of optical modulator holders are provided and combines light beam modulated by each of the plurality of optical modulators;
a fluid branch unit which is provided on a flow path of the cooling fluid in the plurality of fluid circulators and branches the cooling fluid inside to introduce the cooling fluid into each of the optical modulator cooling units of the plurality of optical modulator holders; and
a fluid feed-in unit which is provided on the flow path of the cooling fluid in the plurality of fluid circulators and collectively introduces all the cooling fluid discharged from each of the optical modulator cooling units together, wherein
the fluid branch unit is attached to any one of those end surfaces of the color-combining optical device that cross the plurality of light-incident sides, and
the fluid feed-in unit is attached to any other one of the end surfaces of the color-combining optical device that cross the plurality of light-incident sides.

7. The optical device according to claim 6, wherein
the fluid branch unit and the fluid feed-in unit are made of heat-conductive material, and each have a plurality of holder installation surfaces corresponding to the plurality of light-incident sides of the color-combining optical device, and
the plurality of optical modulator holders are respectively attached heat-transferably to the plurality of holder unit installation surfaces, with the pairs of upright parts of the optical modulator holding units being arranged so as to cross over the holder unit installation surfaces of the fluid branch unit and the holder unit installation surfaces of the fluid feed-in unit.

8. The optical device according to claim 6, wherein
the fluid branch unit and the fluid feed-in unit are made of heat-conductive material, and each have a plurality of holder unit installation surfaces corresponding to the plurality of light-incident sides of the color-combining optical device,
the optical device has a plurality of optical converter which converts optical characteristics of incident light beam,
the optical converter each are constituted by a light-transmissive board having thermal conductivity, and an optical conversion film which is provided on the light-transmissive board and converts optical characteristics of the incident light beam, and
the plurality of optical converter are respectively attached heat-transferably to the plurality of holder unit installation surfaces, with the light-transmissive boards being arranged so as to cross over the holder unit installation surfaces of the fluid branch unit and the holder unit installation surfaces of the fluid feed-in unit.

9. The optical device according to claim 6, further comprising a plurality of reflective polarizer which are respectively attached to the light-incident sides of the color-combining optical device, and respectively transmit light beam having a predetermined polarization axis and reflect light beam having any other polarization axis out of light beams irradiated from the plurality of optical modulators, wherein
the reflective polarizer each reflect the light beam having said any other polarization axis in such a direction as to avoid image formation areas of the optical modulators.

10. The optical device according to claim 9, wherein
each of the reflective polarizer is constituted by a plurality of prisms connected to each other, and a reflective polarization film which is inserted between the plurality of prisms and transmits light beam having a predetermined polarization axis and reflects light beam having any other polarization axis out of the light beams irradiated from the optical modulators,
the plurality of prisms respectively include incident-side prisms having light-incident sides serving as transmissive surfaces which are provided on light-incident sides and transmit the light beam irradiated from the optical modulators, and also serving as totally-reflective surfaces which reflect the light beam reflected by the reflective polarization films, and
the incident-side prisms respectively reflect the light beam reflected by the reflective polarization films, on the totally-reflective surfaces, and irradiate the light beam in such directions as to avoid the image formation areas of the optical modulators.

11. The optical device according to claim 5, further comprising:
a fluid pressure-feed unit provided in the flow path of the cooling fluid in the plurality of fluid circulators, feeds the cooling fluid into the optical modulator cooling units of the optical modulator holders, through the plurality of fluid circulator, to forcibly circulate the cooling fluid.

12. The optical device according to claim 5, wherein
the optical modulators each include: a drive board having a plurality of signal lines, a plurality of switching elements connected to the plurality of signal lines, and a plurality of pixel electrodes connected to the plurality of switching elements; an opposite board opposed to the drive board and having a common electrode; a liquid crystal enclosed between the drive board and the opposite board; a circuit board electrically connected to the plurality of signal lines and the common electrode and protruding from between the drive board and the opposite board; and a pair of light-transmissive board attached to outer surfaces of the drive board and the opposed board and having thermal conductivity, and
in the rectangular plate-like member of each of the optical modulator holding units of the optical modulator holder and the plate-like member, the peripheries of the openings respectively contact heat-transferably the pair of light-transmissive boards of the optical modulators, thus holding the optical modulator inside the rectangular U-shape of the optical modulator holding unit.

13. The optical device according to claim 12, wherein,
in the optical modulator, one of the pair of light-transmissive boards is formed to have an outer shape larger than the other one of the pair of light-transmissive boards, thereby forming a step along a light-incident direction, and inner side surfaces forming a ring-like shape of the optical modulator cooling unit is formed to have a shape corresponding to the step, thereby to allow the optical modulator to be fit in.

14. The optical device according to claim 13, wherein, in a state in which the optical modulator is engaged in the optical modulator cooling unit, the circuit board is bent along a ring-like inner side surface of the optical modulator cooling unit, and is arranged along a light-incident side or light-irradiation side of the optical modulator cooling unit.

15. A projector comprising: a light source device; an optical device having an optical modulator which modulates light beam emitted from the light source in accordance with image information to form an optical image and an optical modulator holder holding and cooling the optical modulator, and a projection optical device which projects an optical image formed by the optical device in an enlarged manner, wherein the optical modulator holder includes:
an optical modulator holding unit including a rectangular plate-like member having an opening corresponding to an image formation area of the optical modulator, and a pair of upright parts being upright in an out-of-plane direction of the rectangular plate-like member respectively from opposed edges of the rectangular plate-like member, the optical modulator holding unit having a substantially rectangular U-shape cross section and being made of heat-conductive material;
a plate-like member having an opening corresponding to the image formation area of the optical modulator, and made of heat-conductive material; and
an optical modulator cooling unit constituted by a hollow member which is made of heat-conductive material and capable of enclosing cooling fluid inside, wherein
in the rectangular plate-like member of the optical modulator holding unit and the plate-like member, peripheries of the respective openings heat-transferably contact respectively with each of a light-incident side and a light-irradiation side of the optical modulator, threreby holding the optical modulator inside the rectangular U-shape of the optical modulator holding unit, and
the optical modulator cooling unit is formed in a ring-like shape arranged so as to surround outer circumference of the optical modulator and connected heat-transferably to the optical modulator on inner side surfaces, the optical modulator cooling unit having an inlet port for introducing the cooling fluid to inside and an outlet port for discharging the cooling fluid from inside to outside.

16. The projector according to claim 15, comprising:
the optical modulator including a plurality of optical modulators;
the optical modulator holder including a plurality of optical modulator holders, corresponding to the plurality of optical modulators;
a color-combining optical device which has plurality of light-incident sides where the plurality of optical modulator holders are provided and combines light beam modulated by each of the plurality of optical modulators;
a fluid branch unit which is provided on a flow path of the cooling fluid in the plurality of fluid circulators and branches the cooling fluid inside to introduce the cooling fluid into each of the optical modulator cooling units of the plurality of optical modulator holders; and
a fluid feed-in unit which is provided on the flow path of the cooling fluid in the plurality of fluid circulators and collectively introduces all the cooling fluid discharged from each of the optical modulator cooling units together, wherein
the fluid branch unit is attached to any one of those end surfaces of the color-combining optical device that cross the plurality of light-incident sides, and
the fluid feed-in unit is attached to any other one of the end surfaces of the color-combining optical device that cross the plurality of light-incident sides.

17. The projector according to claim 16, wherein
the fluid branch unit and the fluid feed-in unit are made of heat-conductive material, and each have a plurality of holder installation surfaces corresponding to the plurality of light-incident sides of the color-combining optical device, and
the plurality of optical modulator holders are respectively attached heat-transferably to the plurality of holder unit installation surfaces, with the pairs of upright parts of the optical modulator holding units being arranged so as to cross over the holder unit installation surfaces of the fluid branch unit and the holder unit installation surfaces of the fluid feed-in unit.

18. The projector according to claim 16, wherein
the fluid branch unit and the fluid feed-in unit are made of heat-conductive material, and each have a plurality of holder unit installation surfaces corresponding to the plurality of light-incident sides of the color-combining optical device,
the projector has a plurality of optical converter which converts optical characteristics of incident light beam,
the optical converter each are constituted by a light-transmissive board having thermal conductivity, and an optical conversion film which is provided on the light-transmissive board and converts optical characteristics of the incident light beam, and
the plurality of optical converter are respectively attached heat-transferably to the plurality of holder unit installation surfaces, with the light-transmissive boards being arranged so as to cross over the holder unit installation surfaces of the fluid branch unit and the holder unit installation surfaces of the fluid feed-in unit.

19. The projector according to claim 16, further comprising a plurality of reflective polarizer which are respectively attached to the light-incident sides of the color-combining optical device, and respectively transmit light beam having a predetermined polarization axis and reflect light beam having any other polarization axis out of light beams irradiated from the plurality of optical modulators, wherein
the reflective polarizer each reflect the light beam having said any other polarization axis in such a direction as to avoid image formation areas of the optical modulators.

20. The projector according to claim 19, wherein
each of the reflective polarizer is constituted by a plurality of prisms connected to each other, and a reflective polarization film which is inserted between the plurality of prisms and transmits light beam having a predetermined polarization axis and reflects light beam having any other polarization axis out of the light beams irradiated from the optical modulators,
the plurality of prisms respectively include incident-side prisms having light-incident sides serving as transmissive surfaces which are provided on light-incident sides and transmit the light beam irradiated from the optical modulators, and also serving as totally-reflective surfaces which reflect the light beam reflected by the reflective polarization films, and the incident-side prisms respectively reflect the light beam reflected by the reflective polarization films, on the totally-reflective surfaces, and irradiate the light beam in such directions as to avoid the image formation areas of the optical modulators.

21. The projector according to claim 15, further comprising:
a fluid pressure-feed unit provided in the flow path of the cooling fluid in the plurality of fluid circulators, feeds the cooling fluid into the optical modulator cooling units of the optical modulator holders, through the plurality of fluid circulator, to forcibly circulate the cooling fluid.

22. The projector according to claim 15, wherein
the optical modulators each include: a drive board having a plurality of signal lines, a plurality of switching elements connected to the plurality of signal lines, and a plurality of pixel electrodes connected to the plurality of switching elements; an opposite board opposed to the drive board and having a common electrode; a liquid crystal enclosed between the drive board and the opposite board; a circuit board electrically connected to the plurality of signal lines and the common electrode and protruding from between the drive board and the opposite board; and a pair of light-transmissive board attached to outer surfaces of the drive board and the opposed board and having thermal conductivity, and in the rectangular plate-like member of each of the optical modulator holding units of the optical modulator holder and the plate-like member, the peripheries of the openings respectively contact heat-transferably the pair of light-transmissive boards of the optical modulators, thus holding the optical modulator inside the rectangular U-shape of the optical modulator holding unit.

23. The projector according to claim 22, wherein,
in the optical modulator, one of the pair of light-transmissive boards is formed to have an outer shape larger than the other one of the pair of light-transmissive boards, thereby forming a step along a light-incident direction, and inner side surfaces forming a ring-like shape of the optical modulator cooling unit is formed to have a shape corresponding to the step, thereby to allow the optical modulator to be fit in.

24. The projector according to claim 23, wherein,
in a state in which the optical modulator is engaged in the optical modulator cooling unit, the circuit board is bent along a ring-like inner side surface of the optical modulator cooling unit, and is arranged along a light-incident side or light-irradiation side of the optical modulator cooling unit.

* * * * *